United States Patent
Katou et al.

(10) Patent No.: US 10,643,162 B2
(45) Date of Patent: May 5, 2020

(54) METHOD, APPARATUS, AND STORAGE MEDIUM

(71) Applicant: FUJITSU LIMITED, Kawasaki-shi, Kanagawa (JP)

(72) Inventors: Masashi Katou, Nagoya (JP); Masahiro Fukuda, Nagoya (JP); Shinji Nagasawa, Kawasaki (JP); Takamasa Ohashi, Toyoake (JP); Kazuyuki Sakai, Nissin (JP); Yuta Kojima, Nagoya (JP); Eiichi Higuchi, Toyota (JP); Shotaro Okada, Nishinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 856 days.

(21) Appl. No.: 14/990,255

(22) Filed: Jan. 7, 2016

(65) Prior Publication Data
US 2016/0292617 A1   Oct. 6, 2016

(30) Foreign Application Priority Data

Mar. 30, 2015   (JP) ................. 2015-068317

(51) Int. Cl.
*G06Q 10/06*   (2012.01)
(52) U.S. Cl.
CPC ............. *G06Q 10/06316* (2013.01); *G06Q 10/063114* (2013.01)
(58) Field of Classification Search
None
See application file for complete search history.

(56) References Cited

U.S. PATENT DOCUMENTS

| | | | | |
|---|---|---|---|---|
| 4,851,999 | A * | 7/1989 | Moriyama | G06Q 10/10 705/30 |
| 9,118,632 | B1 * | 8/2015 | Chuang | H04L 63/0428 |
| 9,405,929 | B1 * | 8/2016 | Van Rotterdam | G06F 21/6218 |
| 2002/0186258 | A1 * | 12/2002 | Shibata | G06F 3/0486 715/838 |
| 2003/0078975 | A1 * | 4/2003 | Ouchi | G06Q 10/10 709/205 |

(Continued)

FOREIGN PATENT DOCUMENTS

| | | |
|---|---|---|
| JP | 5-298120 A | 11/1993 |
| JP | 5-324283 | 12/1993 |

(Continued)

OTHER PUBLICATIONS

Office Action dated Sep. 4, 2018 in Japanese Patent Application No. 2015-088317 (with English translation), 7 pages.

*Primary Examiner* — Octavian Rotaru
(74) *Attorney, Agent, or Firm* — Xsensus LLP

(57) ABSTRACT

A method includes: first creating determination information on whether or not the second file is derived from the first file based on a file name or file content of a first file to which writing is performed by a first job and a file name or file content of a second file from which reading is performed by a second job; second creating predecessor-successor information indicating a predecessor-successor relationship between the first job and the second job based on the determination information; and outputting the predecessor-successor information in a manner that allows an administrator to keep track of the predecessor-successor relationship between the first job and the second job.

18 Claims, 28 Drawing Sheets

(56) References Cited

U.S. PATENT DOCUMENTS

| | | | | |
|---|---|---|---|---|
| 2004/0226019 | A1* | 11/2004 | Tucker | G06F 9/468 |
| | | | | 719/310 |
| 2006/0149708 | A1* | 7/2006 | Lavine | G06F 16/2455 |
| 2009/0276779 | A1* | 11/2009 | Kato | G06F 9/4843 |
| | | | | 718/102 |
| 2010/0070422 | A1* | 3/2010 | Kikuchi | G06F 9/5038 |
| | | | | 705/301 |
| 2010/0174751 | A1* | 7/2010 | Kawano | G06F 21/6218 |
| | | | | 707/784 |
| 2012/0117570 | A1* | 5/2012 | Ozaki | G06Q 10/06 |
| | | | | 718/102 |
| 2013/0080834 | A1* | 3/2013 | Sakai | G06F 11/3696 |
| | | | | 714/32 |
| 2013/0174280 | A1* | 7/2013 | Fujimori | G06F 21/6209 |
| | | | | 726/30 |
| 2014/0122505 | A1* | 5/2014 | Kudo | G06F 17/30687 |
| | | | | 707/748 |
| 2014/0181213 | A1* | 6/2014 | Hunter | H04L 67/1095 |
| | | | | 709/205 |
| 2014/0297354 | A1* | 10/2014 | Kogiso | G06Q 10/06316 |
| | | | | 705/7.26 |
| 2014/0297355 | A1* | 10/2014 | Ohashi | G06Q 10/06316 |
| | | | | 705/7.26 |
| 2014/0379586 | A1* | 12/2014 | Sawyer | H04L 67/00 |
| | | | | 705/301 |
| 2015/0207866 | A1* | 7/2015 | Fujie | G06F 9/445 |
| | | | | 709/204 |
| 2015/0295872 | A1* | 10/2015 | Hawryluk | G06F 21/6245 |
| | | | | 715/752 |

FOREIGN PATENT DOCUMENTS

| | | |
|---|---|---|
| JP | 2003-241961 A | 8/2003 |
| JP | 2006-243996 | 9/2006 |
| JP | 2009-163566 | 7/2009 |

* cited by examiner

FIG. 4

| JOB NAME | STARTING CONDITION | STARTING TIME | TRIGGER FILE | JOB | PREDECESSOR-SUCCESSOR RELATIONSHIP | ... |
|---|---|---|---|---|---|---|
| out1 | TIME | 10:00 | – | C:¥a.exe | | ... |
| in1 | WAIT FOR FILE | – | C:¥XA | C:¥b.exe | PREDECESSOR=out1 | ... |
| out2 | TIME | 13:00 | – | C:¥c.exe | | ... |
| in2 | WAIT FOR FILE | – | C:¥YB | C:¥d.exe | PREDECESSOR=out2 | ... |
| out3 | WAIT FOR EVENT | – | – | C:¥e.exe | | ... |
| in3 | WAIT FOR FILE | – | C:¥YC* | C:¥f.exe | PREDECESSOR=out3 | ... |
| out4 | WAIT FOR EVENT | – | – | C:¥g.exe | | ... |
| in4 | WAIT FOR FILE | – | C:¥XD | C:¥h.exe | PREDECESSOR=out4 | ... |
| ... | ... | ... | ... | ... | ... | ... |

FIG. 5

| JOB NAME | STARTING TIME | COMPLETION TIME | STATUS | COMPLETION CODE | FULL PATH OF TRIGGER FILE |
|---|---|---|---|---|---|
| out1 | 10:00:00 | 10:12:34 | NORMAL COMPLETION | 0 | – |
| in1 | 10:56:01 | 11:22:33 | NORMAL COMPLETION | 0 | C:¥XA |
| out2 | 13:00:00 | 13:20:50 | NORMAL COMPLETION | 0 | – |
| in2 | 13:52:04 | 13:59:56 | NORMAL COMPLETION | 0 | C:¥YB |
| out3 | 16:05:11 | 16:06:45 | NORMAL COMPLETION | 0 | – |
| in3 | 16:10:32 | 16:12:08 | NORMAL COMPLETION | 0 | C:¥YC+1234-5678 |
| out3 | 16:15:29 | 16:16:40 | NORMAL COMPLETION | 0 | – |
| in3 | 16:20:23 | 16:22:17 | NORMAL COMPLETION | 0 | C:¥YC+1234-5679 |
| out3 | 16:35:06 | 16:36:19 | NORMAL COMPLETION | 0 | – |
| in3 | 16:40:00 | 16:42:08 | NORMAL COMPLETION | 0 | C:¥YC+1234-5681 |
| out4 | 19:22:22 | 19:22:47 | NORMAL COMPLETION | 0 | – |
| out4 | 19:24:09 | 19:24:55 | NORMAL COMPLETION | 0 | – |
| out4 | 19:28:41 | 19:29:30 | NORMAL COMPLETION | 0 | – |
| in4 | 19:35:11 | 19:40:35 | NORMAL COMPLETION | 0 | C:¥YD |
| ... | ... | ... | ... | ... | ... |

FIG. 6

| JOB NAME | FULL PATH OF FILE | ACCESS TYPE | ACCESS PERMISSION TO FILE | UNIQUE ID COLUMN NUMBER |
|---|---|---|---|---|
| out1 | C:¥XA | OUTPUT | GrpA=rw | |
| in1 | C:¥XA | INPUT | GrpA=rw | |
| out2 | C:¥XB | OUTPUT | GrpB=rw | 1 |
| in2 | C:¥YB | INPUT | GrpB=rw | 1 |
| out3 | C:¥XC+1234-5678 | OUTPUT | GrpA=rw | |
| in3 | C:¥YC+1234-5678 | INPUT | GrpA=rw | |
| out3 | C:¥XC+1234-5679 | OUTPUT | GrpA=rw | |
| in3 | C:¥YC+1234-5679 | INPUT | GrpA=rw | |
| out3 | C:¥XC+1234-5681 | OUTPUT | GrpA=rw | |
| in3 | C:¥YC+1234-5681 | INPUT | GrpA=rw | |
| out4 | C:¥XD+1234-5695 | OUTPUT | GrpB=rw | |
| out4 | C:¥XD+1234-5696 | OUTPUT | GrpB=rw | |
| out4 | C:¥XD+1234-5697 | OUTPUT | GrpB=rw | |
| in4 | C:¥YD | INPUT | GrpB=rw | 1,8 |
| ⋮ | ⋮ | ⋮ | ⋮ | ⋮ |

FIG. 7

```
1234-0011,PRODUCTa,¥10,000,,···
1234-0012,PRODUCTb,¥40,000,,···
1234-0015,PRODUCTc,¥20,000,,···
```

FIG. 8

```
1234-0011,PRODUCTa,¥10,000,20141029,・・・
1234-0012,PRODUCTb,¥40,000,20141029,・・・
1234-0015,PRODUCTc,¥20,000,20141029,・・・
```

FIG. 9

```
1234-5695,PRODUCTa,¥10,000,20141029,···
1234-5696,PRODUCTc,¥20,000,20141029,···
1234-5697,PRODUCTd,¥10,000,20141029,···
```

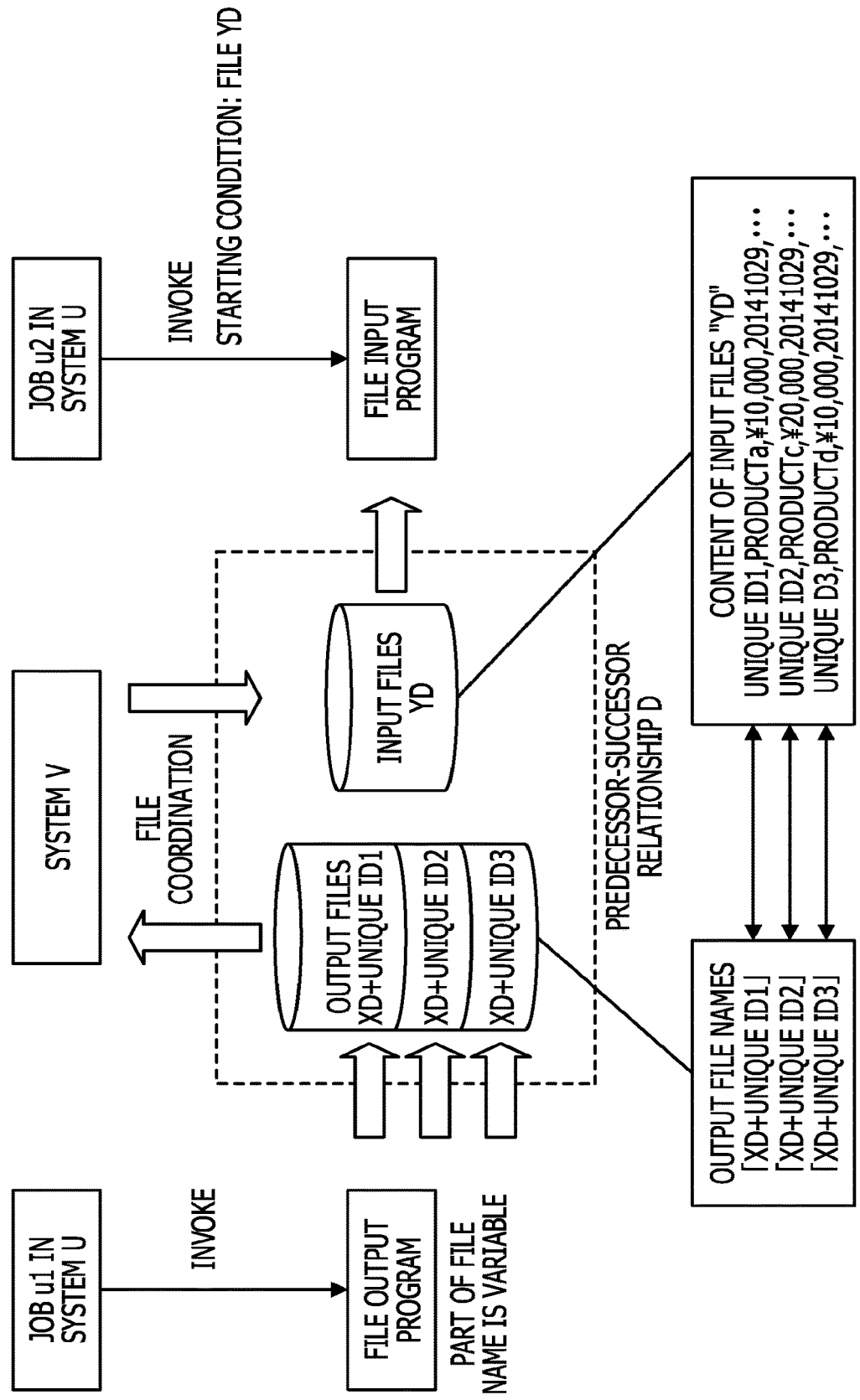

FIG. 18

|   | 1 | 2 | 3 | 4 | 5 | 6 |
|---|---|---|---|---|---|---|
| 1 | a01, | b01, | c01, | d01, | e01, | f01 |
| 2 | a01, | b02, | c02, | d02, | e02, | f02 |
| 3 | a03, | (NULL), | c03, | d03, | e03, | f03 |
| 4 | a04, | b04, | c-04, | d04, | e04, | f04 |
| 5 | a05, | b05, | c05, | a 05, | e05, | f05 |

FIG. 20

| JOB NAME | STARTING CONDITION | STARTING TIME | TRIGGER FILE | JOB | DERIVED COUPLING RELATIONSHIP | ... |
|---|---|---|---|---|---|---|
| out99 | WAIT FOR EVENT | - | - | C:¥a.exe | | ... |
| in3 | WAIT FOR FILE | - | C:¥C* | C:¥f.exe | PREDECESSOR=out99 | ... |

FIG. 21

| No. | JOB NAME | STARTING TIME | COMPLETION TIME | STATUS | COMPLETION CODE | FULL PATH OF TRIGGER FILE |
|---|---|---|---|---|---|---|
| 1 | ou99 | 16:05:11 | 16:06:45 | NORMAL COMPLETION | 0 | - |
| 2 | in3 | 16:10:32 | 16:12:08 | NORMAL COMPLETION | 0 | C:\C+1234-5678 |
| 3 | out99 | 16:15:29 | 16:16:40 | NORMAL COMPLETION | 0 | - |
| 4 | in3 | 16:20:23 | 16:22:17 | NORMAL COMPLETION | 0 | C:\C+1234-5679 |

FIG. 22

| No. | JOB NAME | STARTING TIME | COMPLETION TIME | STATUS | COMPLETION CODE | FULL PATH OF TRIGGER FILE |
|---|---|---|---|---|---|---|
| 1 | ou99 | 16:05:11 | 16:06:45 | NORMAL COMPLETION | 0 | – |
| 2 | in3 | 16:10:32 | 16:12:08 | NORMAL COMPLETION | 0 | C:¥C+1234-5678 |
| 3 | out99 | 16:15:29 | 16:16:40 | NORMAL COMPLETION | 0 | – |
| 4 | in3 | 16:20:23 | 16:22:17 | NORMAL COMPLETION | 0 | C:¥C+1234-5679 |
| 3 | out99 | 16:35:06 | 16:41:19 | NORMAL COMPLETION | 0 | – |
| 4 | in3 | 16:40:00 | 16:42:08 | NORMAL COMPLETION | 0 | C:¥C+1234-5681 |

FIG. 23

| JOB NAME | STARTING CONDITION | STARTING TIME | TRIGGER FILE | JOB | DERIVED COUPLING RELATIONSHIP | ... |
|---|---|---|---|---|---|---|
| out99 | WAIT FOR EVENT | — | — | C:¥z.exe | | ... |
| in3 | WAIT FOR FILE | — | C:¥C* | C:¥f.exe | REMOVE=out99 | ... |

METHOD, APPARATUS, AND STORAGE MEDIUM

CROSS-REFERENCE TO RELATED APPLICATION

This application is based upon and claims the benefit of priority of the prior Japanese Patent Application No. 2015-068317, filed on Mar. 30, 2015, the entire contents of which are incorporated herein by reference.

FIELD

The embodiment discussed herein is related to techniques for supporting job management.

BACKGROUND

Integrating a plurality of systems distributed among a plurality of sites into a single site is performed through virtualization. With reference to FIG. 1 and FIG. 2, integration of a plurality of systems will be described. FIG. 1 is a diagram illustrating a state before integration, in which a head factory system, an X branch system, and a Y branch system operate. An elliptical shape represents a job.

Each system exchanges files with another system and, in each system, changes are made to files by executing jobs or by performing user operations. For example, an order file 1001 containing purchase order data created by a job of the X branch system is sent to the head factory system, and a purchase order file 1003 containing purchase order data created by a job of the Y branch system is sent to the head factory system. In the head factory system, production plan data is created from the received purchase order files 1001 and 1003. The head factory system sends expected delivery files 1002 and 1004 created based on the production plan data to the X branch system and the Y branch system. In the X branch system, expected delivery data contained in the expected delivery file 1002 is read by a job, and processing for the read expected delivery data is executed by a job X. In the Y branch system, expected delivery data contained in the expected delivery file 1004 is read by a job, and processing for the read expected delivery data is executed by a job Y.

In the example in FIG. 1, operation administrators M1, M2, and M3 of systems only perform management of their respective systems. The operation administrators M1, M2, and M3 of the systems do not keep track of processing that is executed for a file sent from one of the systems managed by themselves to another system. For example, the administrator M2, who is the operation administrator of the X branch system, does not keep track of what processing is executed for the purchase order file 1001 in the head factory system.

FIG. 2 is a diagram illustrating a system after integration. In the example in FIG. 2, a head factory server, an X branch server, and a Y branch server are run on physical resources installed at a certain site. These servers are virtual servers. The head factory server performs operations similar to those in the head factory system illustrated in FIG. 1, the X branch server performs operations similar to those in the X branch system illustrated in FIG. 1, and the Y branch server performs operations similar to those in the Y branch system illustrated in FIG. 1.

As illustrated in FIG. 2, even if integration is implemented, there are some cases where each virtual server operates independently, and the relationships among a plurality of systems before integration remain unchanged. In such cases, an operation administrator of a system after integration is not able to directly keep track of the predecessor-successor relationship for a plurality of jobs that cooperate through using files (that is, the order in which the plurality of jobs are executed).

Japanese Laid-open Patent Publication No. 5-324283 is known as an example of the related art techniques.

SUMMARY

According to an aspect of the invention, a method executed by a computer, the method comprising: first creating determination information on whether or not the second file is derived from the first file based on a file name or file content of a first file to which writing is performed by a first job and a file name or file content of a second file from which reading is performed by a second job; second creating predecessor-successor information indicating a predecessor-successor relationship between the first job and the second job based on the determination information; and outputting the predecessor-successor information in a manner that allows an administrator to keep track of the predecessor-successor relationship between the first job and the second job.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 depicts an example of data stored in a job definition storage unit;

FIG. 5 depicts an example of data stored in an execution history storage unit;

FIG. 6 depicts an example of data stored in an access data storage unit;

FIGS. 7, 8, and 9 depict examples of files stored in a file storage unit;

FIGS. 16B, 16C, 16D, and 16E are diagrams for explaining identification of the predecessor-successor relationships;

FIG. 18 depicts an example of data in a file;

FIG. 20 depicts an example of data stored in the job definition storage unit;

FIGS. 21 and 22 depict examples of data stored in the execution history storage unit;

FIG. 23 depicts an example of data stored in the job definition storage unit.

DESCRIPTION OF EMBODIMENT

An object of an aspect of the present embodiment is to keep track of the predecessor-successor relationship for a plurality of jobs that cooperate.

Figure 1:
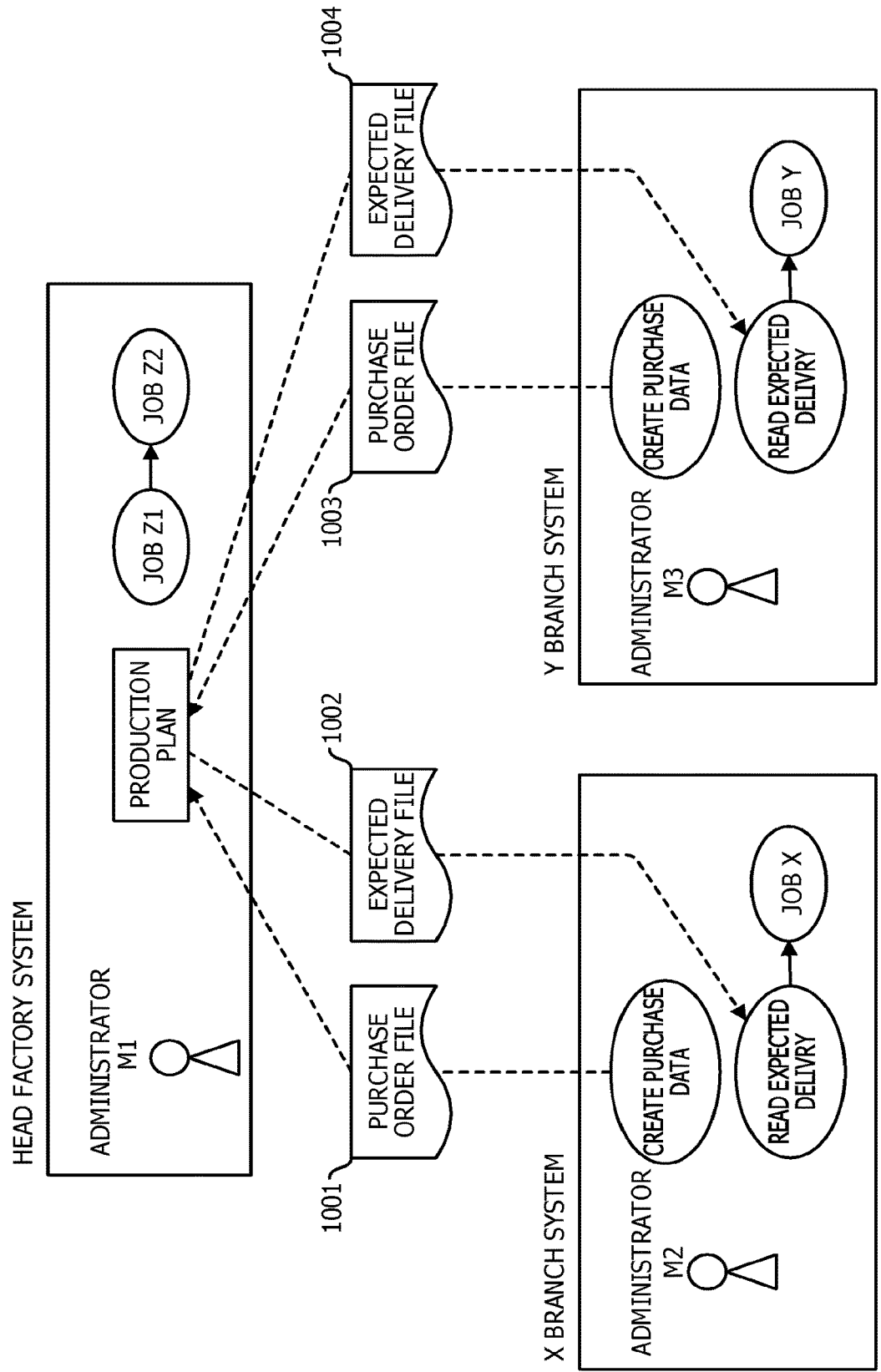
FIGS. 1 and 2 are diagrams for explaining integration of a plurality of systems.
Figure 2:
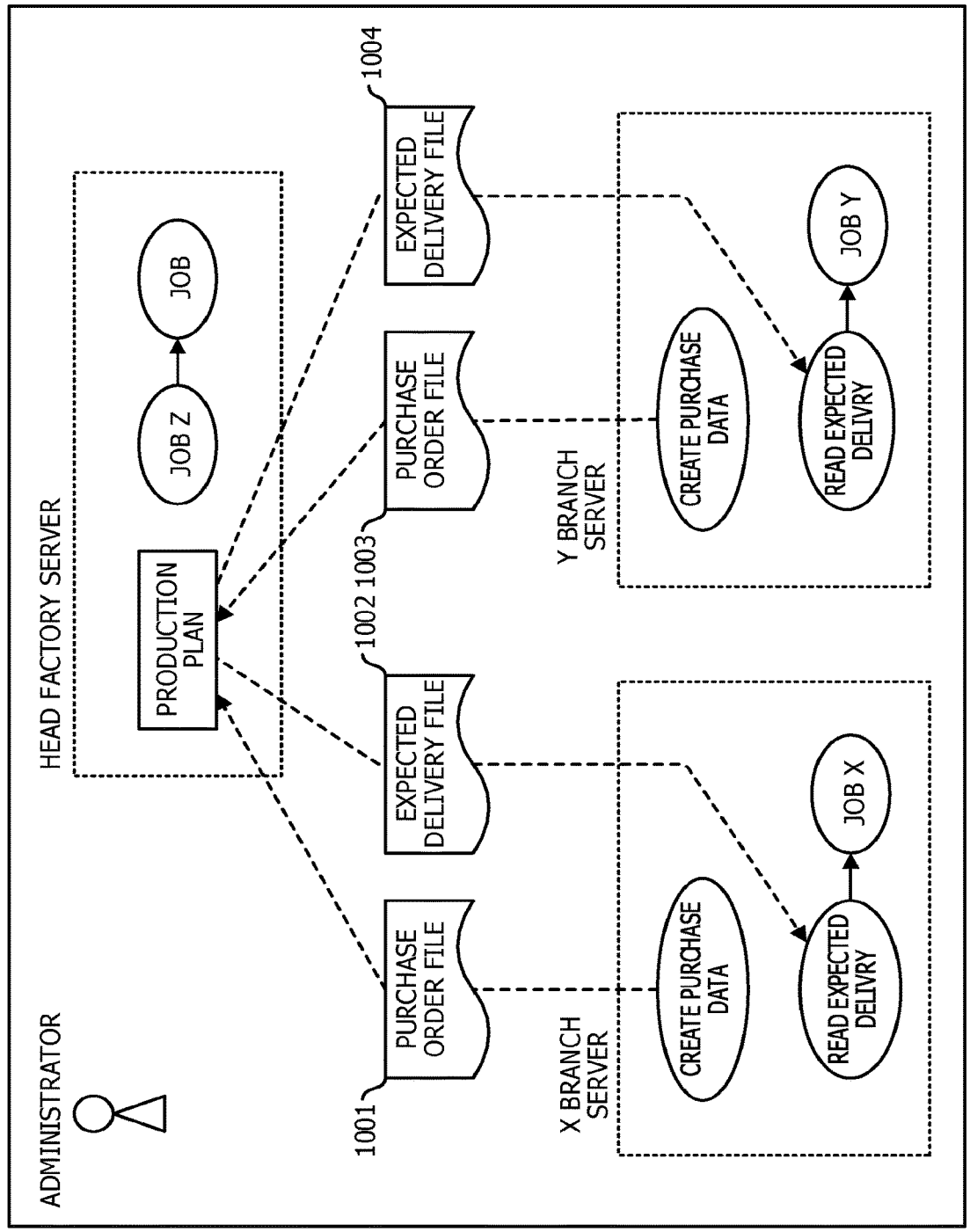
Figure 3:
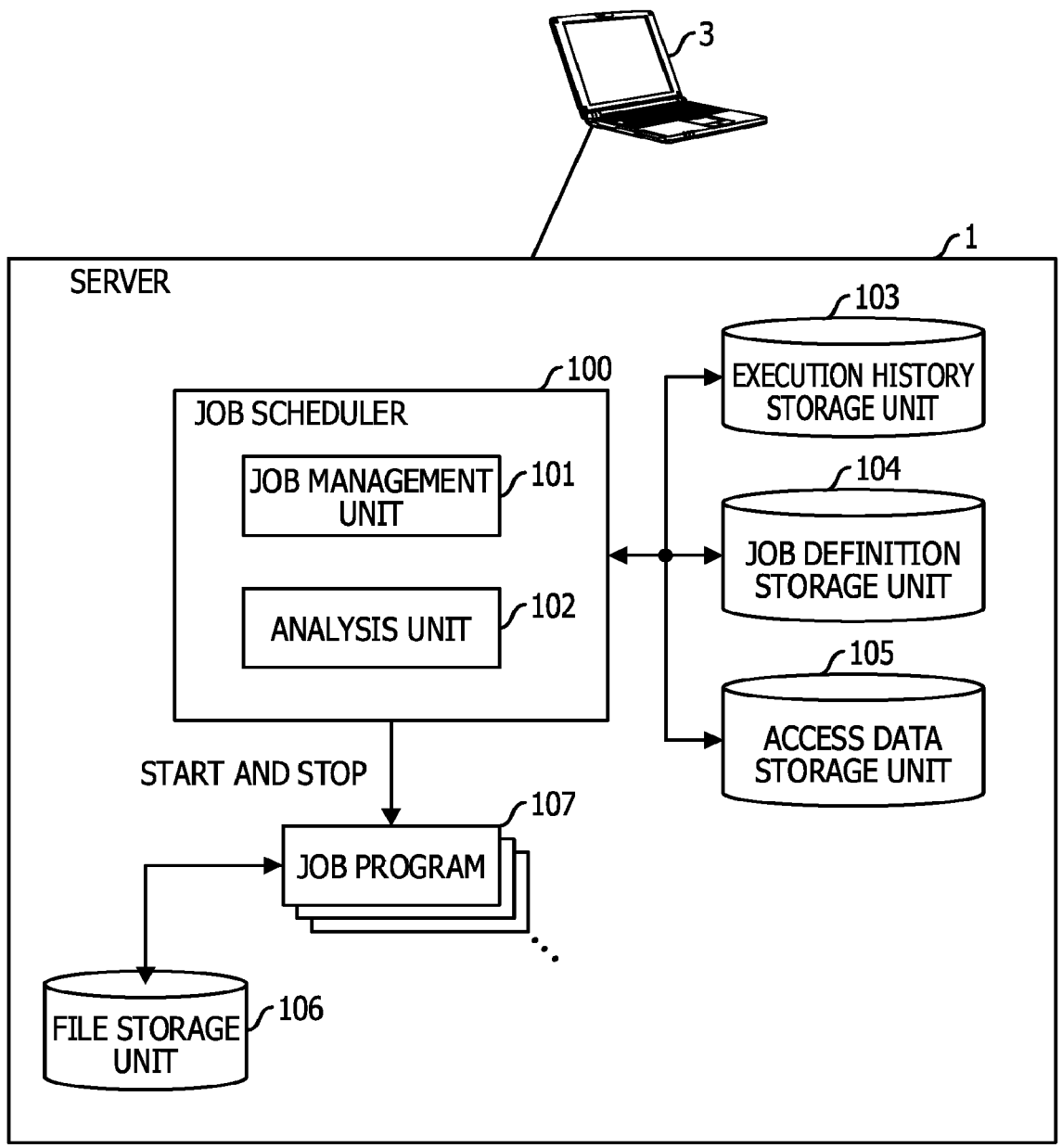
FIG. 3 is a functional block diagram of a server.

FIG. 3 illustrates a functional block diagram of a server 1 in the present embodiment. The server 1 includes a job scheduler 100, an execution history storage unit 103, a job definition storage unit 104, an access data storage unit 105, a file storage unit 106, and a plurality of job programs 107. The job scheduler 100 includes a job management unit 101 and an analysis unit 102. A client terminal 3 operated by an administrator who manages the server 1 is coupled to the server 1.

A plurality of systems are integrated into the server 1. A plurality of job programs executed on the plurality of systems before being integrated are the plurality of job programs 107. By a plurality of jobs implemented by the plurality of job programs 107, processing for files stored in the file storage unit 106 is executed.

The job management unit 101 manages starting and stopping of the plurality of job programs 107. The job management unit 101 saves execution histories of the plurality of job programs 107 in the execution history storage unit 103. When the plurality of job programs 107 access files stored in the file storage unit 106, the job management unit 101 stores information on the access in the access data storage unit 105.

The analysis unit 102 executes an analysis process in response to a call from the job management unit 101 and stores a result of the analysis process in the job definition storage unit 104.

FIG. 4 depicts an example of data stored in the job definition storage unit 104. In the example in FIG. 4, information representing a job name, a starting condition, a starting time, the file name of a trigger file, a job program name, and a predecessor-successor relationship is stored. The trigger file is a file whose creation or update triggers execution of a job, that is, a file whose creation or update satisfies a starting condition. For example, when the starting condition is "wait for file", a job program 107 is invoked once a trigger file is created or updated. Nothing is initially stored in a column for information representing a predecessor-successor relationship.

In the present embodiment, a file name is determined from a system name, the type of data in the file, the date and time, a unique identifier (ID), and the like. The system name is a name such as "X branch system" or "head factory system". Information on the type of data includes, for example, information for discriminating among a product name or a product category, a purchase order, expected delivery, shipping, service, and the like. Information on the date and time is information in a form such as "20141014" or "201410140900". The unique ID is, for example, a request ID, a purchase order ID, a slip ID, or the like. The request ID is an ID assigned to each request processing. The purchase order ID is an ID assigned to each purchase order. The slip ID is an ID assigned to each slip. The file name is given in a form such as "X-SHA.csv" or "X-Ka-20141014.csv". The former is a file name given to a file related to "X branch", "product S", "purchase order data", and "request ID=A". The latter is a file name given to a file related to "X branch", "service", "aa data", and "Oct. 14, 2014".

FIG. 5 depicts an example of data stored in the execution history storage unit 103. In the example in FIG. 5, a job name, the starting time of a job, the completion time of the job, information representing the status of the job, a completion code, and the full path of a trigger file are stored.

FIG. 6 depicts an example of data stored in the access data storage unit 105. In the example in FIG. 6, a job name, the full path of a file accessed in a job, an access type, information indicating access permission to the file (for example, information on the owner of the file), and a unique ID column number are stored. The unique ID column number is the number of a column containing information that is available as a unique ID, among columns contained in the file accessed in the job.

FIGS. 7, 8, and 9 depict examples of files stored in the file storage unit 106. FIG. 7 is a diagram depicting content of a file "C:\XB" in FIG. 6. In this example, slip IDs, identification information of products, and information on prices are stored. FIG. 8 is a diagram depicting content of a file "C:\YB" in FIG. 6. In this example, slip IDs, identification information of products, information on prices, and information representing dates are stored. FIG. 9 is a diagram depicting content of a file "C:\YD" in FIG. 6. In this example, slip IDs, identification information of products, information on prices, and information representing dates are stored.

Figure 10:
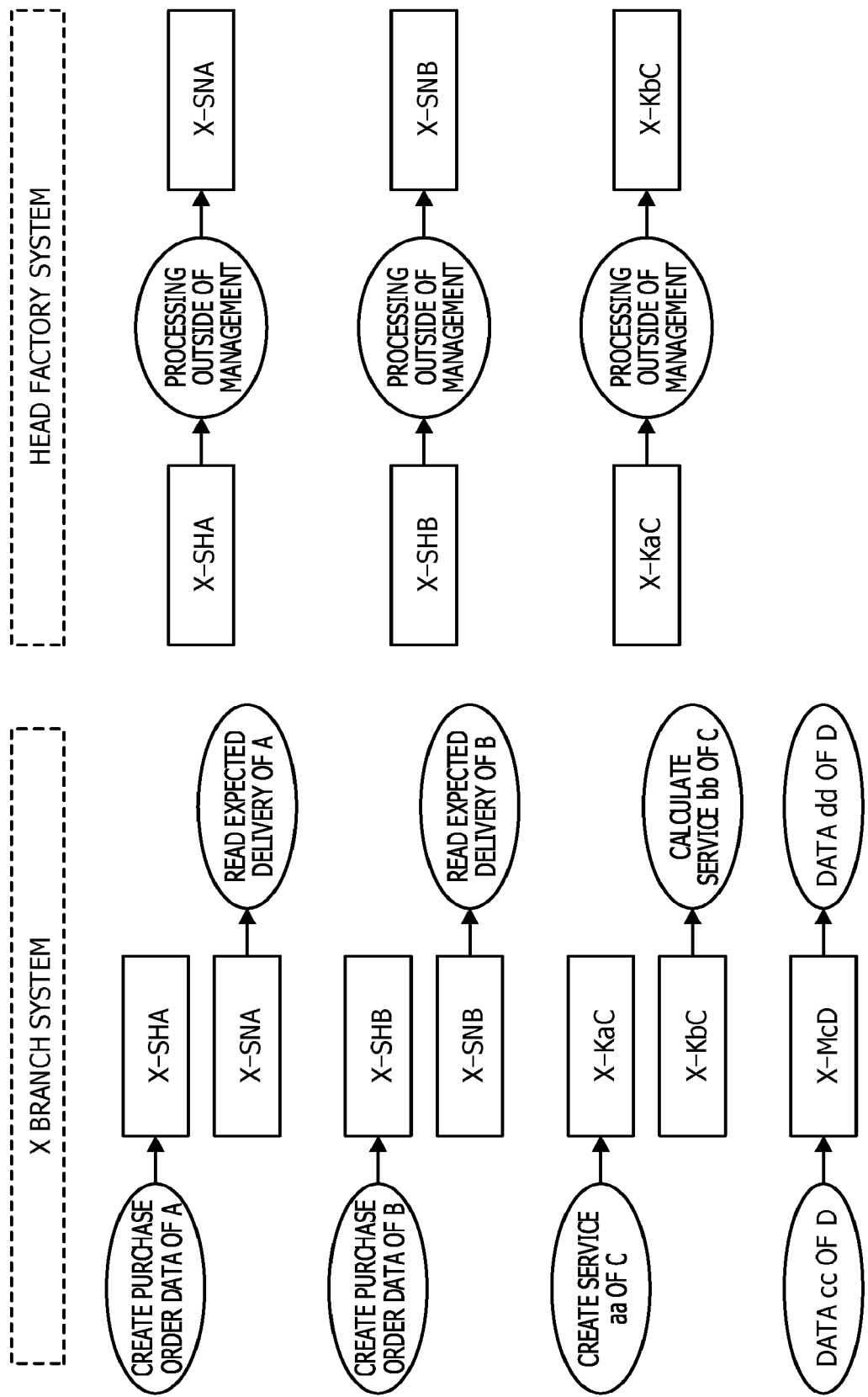
FIG. 10 is a diagram for explaining the relationship between jobs and input and output of files.

With reference to FIG. 10, the relationship between jobs and input and output of files will be described. In FIG. 10, an elliptical shape represents processing performed by a job or user operations, and a rectangular shape represents a file. On the left side of FIG. 10, processing performed in the X branch system among a plurality of systems before integration is illustrated, and, on the right side of FIG. 10, processing performed in the head factory system among the plurality of systems before integration is illustrated.

In FIG. 10, in the X branch system, a job of creating purchase order data of a product "A" is executed, and a file "X-SHA" is output. The file "X-SHA" is translated into a file "X-SNA" by processing performed in the head factory system. The processing performed here is not covered by the management of the administrator of the X branch system. The file "X-SNA" is provided as an input to a job "read expected delivery of A" in the X branch system. In such a case, the file "X-SNA" is a file derived from the file "X-SHA".

Similarly, in the X branch system, a job of creating purchase order data of a product "B" is executed, and a file "X-SHB" is output. The file "X-SHB" is translated into a file "X-SNB" by processing performed in the head factory system. The processing performed here is not covered by management of the administrator of the X branch system. The file "X-SNB" is provided as an input to a job "read expected delivery of B" in the X branch system. In such a case, the file "X-SNB" is a file derived from the file "X-SHB".

In the X branch system, a file "X-KaC" is output by a job "create service aa of C". The file "X-KaC" is translated into a file "X-KbC" by processing performed in the head factory system. The processing performed here is not covered by management of the administrator of the X branch system. The file is provided as an input to a job "calculate service bb of C" in the X branch system. In such a case, the file "X-KbC" is a file derived from the file "X-KaC".

In the X branch system, a file "X-McD" is output by a job "data cc of D" and is provided as an input to a job "data dd of D".

As described above, before integration, a plurality of jobs in a plurality of systems cooperate through using files. There is a predecessor-successor relationship between jobs (that is, the order in which jobs are executed) such that, for example, a file output by a certain job is provided as an input to another job. It is assumed that such a predecessor-successor relationship is taken over by the server 1, unchanged, without being redefined or being reconstructed.

Next, with reference to FIGS. 11, 12, 13 and 14, predecessor-successor relationships of input files and output files will be described. In FIGS. 11, 12, 13, and 14, a job u1 in a system U invokes a file output program (here, any of the plurality of job programs 107). A job executed by the file output program outputs a file. The output file is processed in a system V and is passed back to the system U. If the starting condition is satisfied, a job u2 in the system U invokes a file input program (any of the plurality of job programs 107). A job executed by the file input program reads the file passed from the system V.

Figure 11:
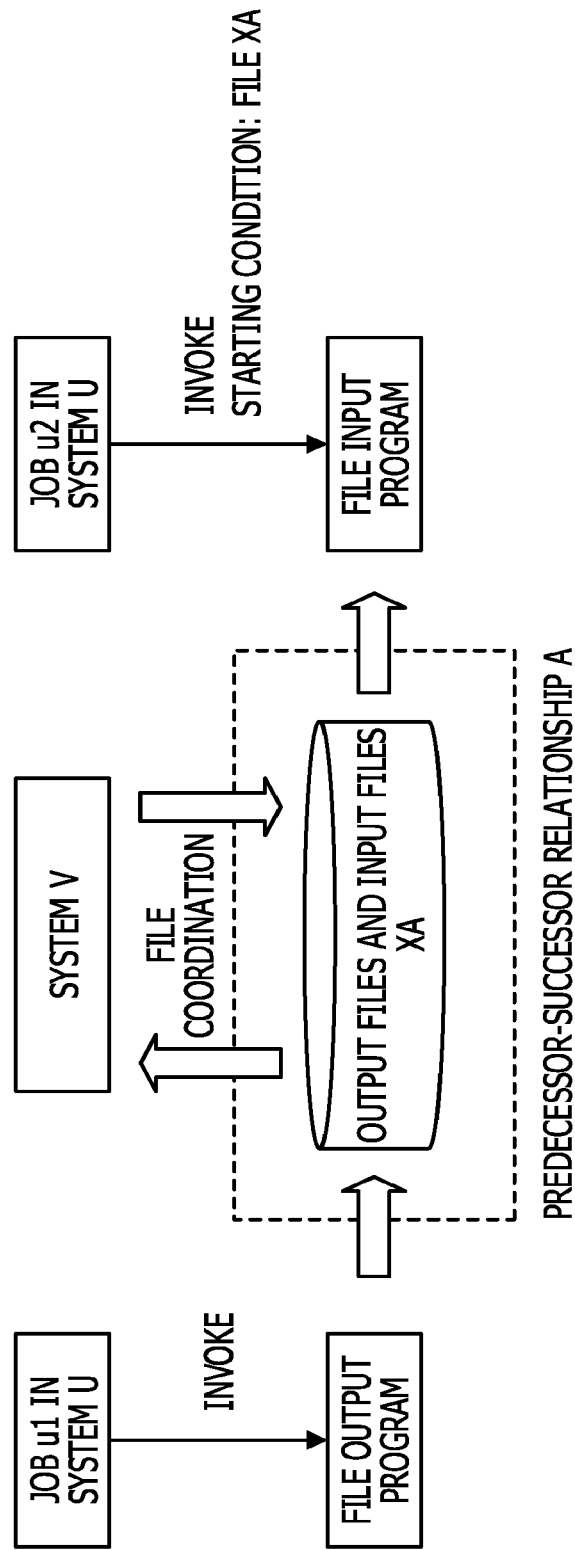
FIGS. 11, 12, 13, and 14 are diagrams for explaining predecessor-successor relationships of input files and output files.

FIG. 11 illustrates an example of a predecessor-successor relationship of input files and output files. In the example in FIG. 11, a file name "XA" of output files from the file output program and a file name "XA" of input files to the file input program are the same. The file name of an output file is "XA" at any time, and the file name of an input file is "XA" at any time. There is one input file for one output file. For example, a plurality of records are collected in a single file and are processed. Hereinafter, the predecessor-successor relationship illustrated in FIG. 11 is referred to as a predecessor-successor relationship A.

Figure 12:
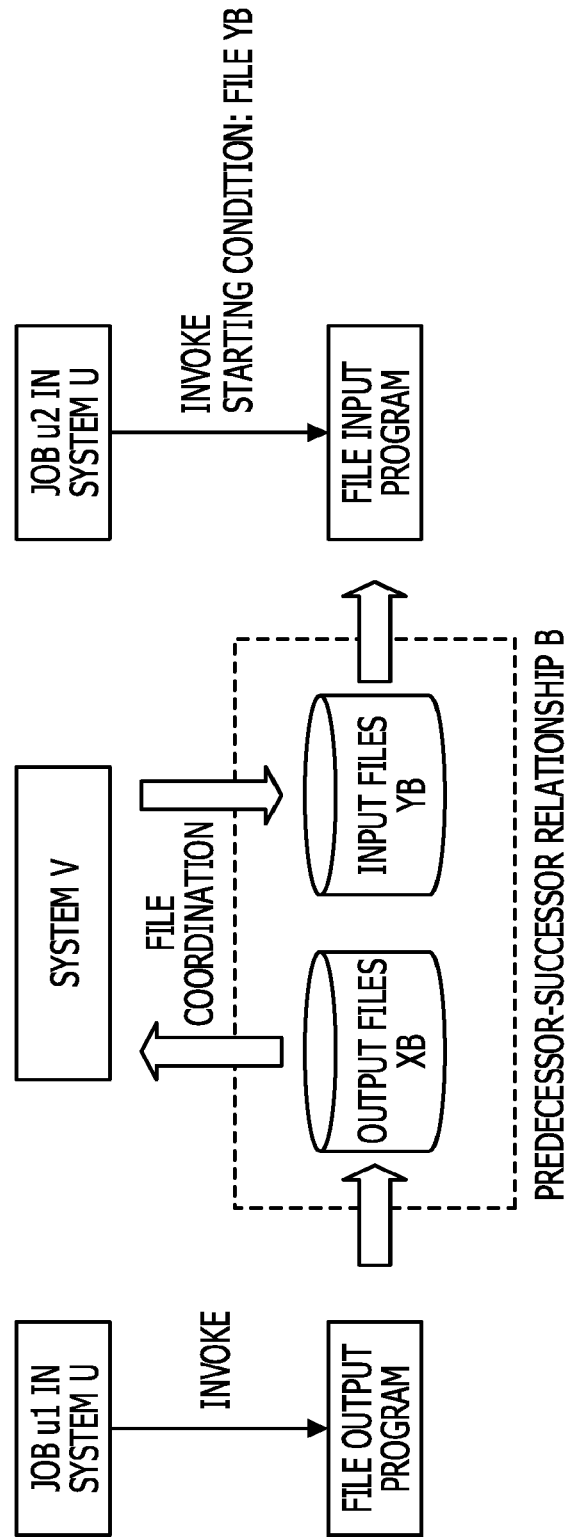

FIG. 12 illustrates another example of the predecessor-successor relationship of input files and output files. In the example in FIG. 12, the file name "XB" of output files from the file output program and a file name "YB" of input files to the file input program are not the same. However, the file name of an output file is "XB" at any time, and the file name of an input file is "YB" at any time. There is one input file for one output file. For example, a plurality of records are collected in a single file and are processed. Hereinafter, the predecessor-successor relationship illustrated in FIG. 12 is referred to as a predecessor-successor relationship B.

Figure 13:
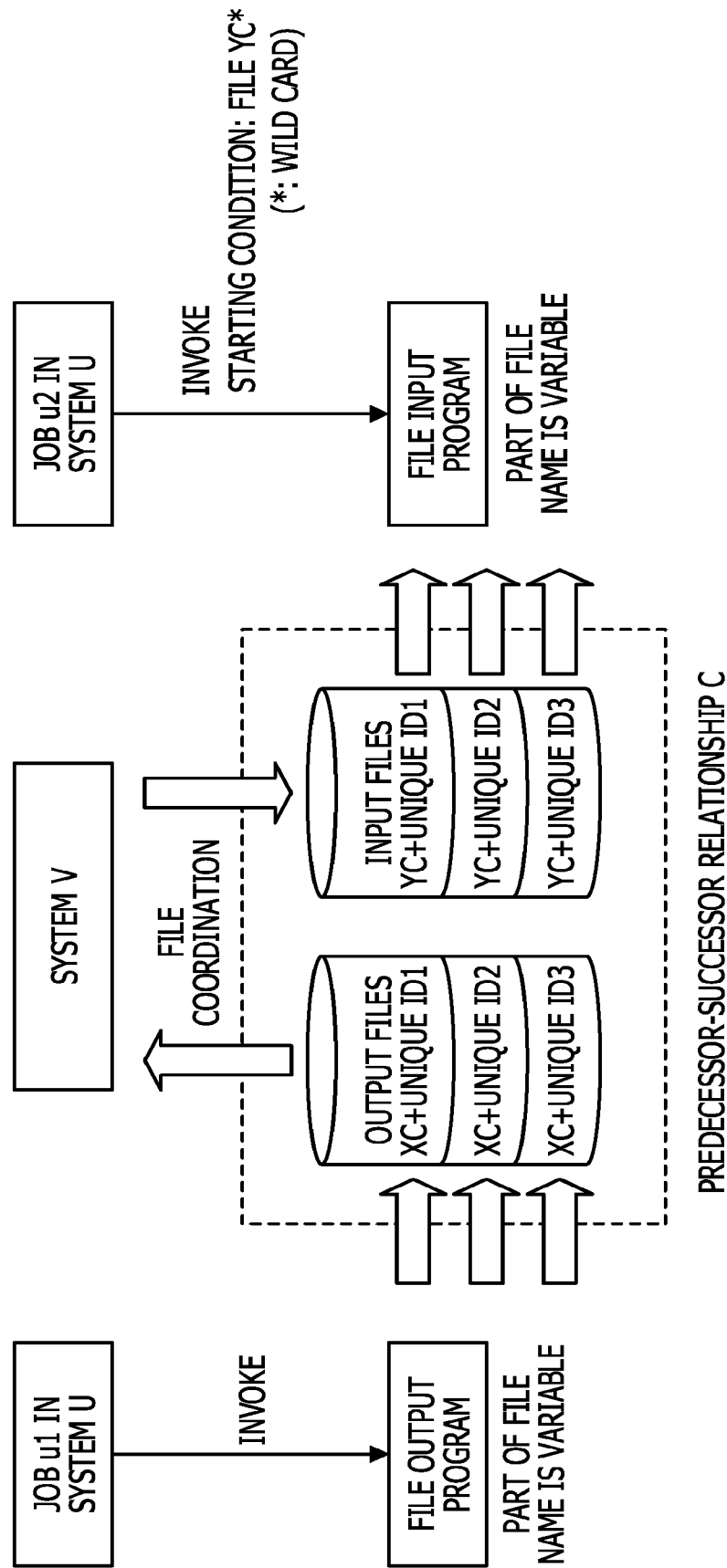

FIG. 13 illustrates another example of the predecessor-successor relationship for input files and output files. In the example in FIG. 13, the form of the file names of files output from the file output program is "XC+unique ID", in which the portion of "unique ID" is variable. The form of the file names of files provided as inputs to the file input program is "YC+unique ID", in which the part of "unique ID" is variable. In the example in FIG. 13, an output file "XC+unique ID1", an output file "XC+unique ID2", an output file "XC+unique ID3", and so forth are output, and an input file "YC+unique ID1", an input file "YC+unique ID2", an input file "YC+unique ID3", and so forth are read. There is one input file for one output file. A plurality of records may be collected in a single file and be processed, or one record may be contained in one file. In the latter case, for example, a slip ID is utilized as a unique ID. Hereinafter, the predecessor-successor relationship illustrated in FIG. 13 is referred to as a predecessor-successor relationship C.

Figure 14:
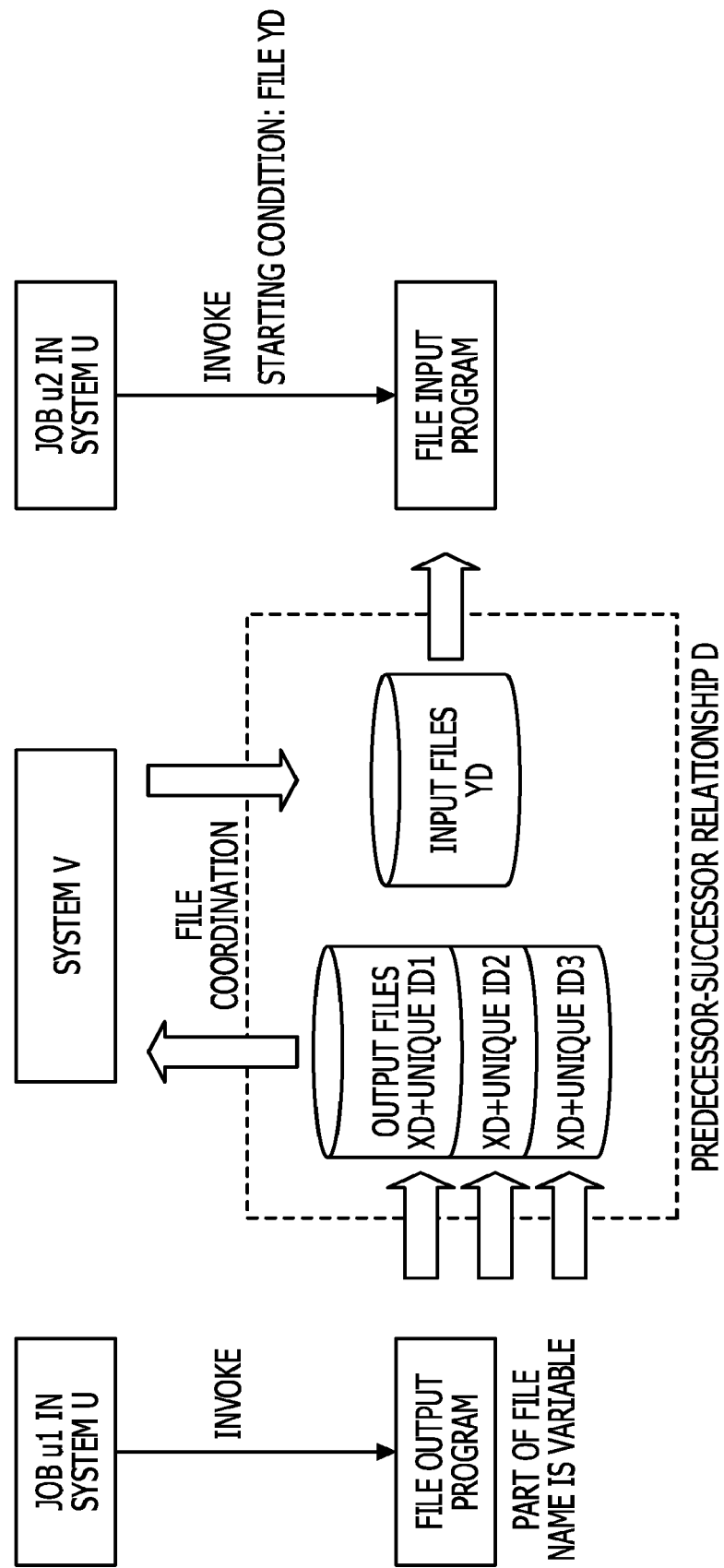

FIG. 14 illustrates another example of the predecessor-successor relationship for input files and output files. In the example in FIG. 14, the form of the file names of files output from the file output program is "XD+unique ID", in which the part of "unique ID" is variable. The form of the file names of files input from the file input program is "YD" at any time. In the example in FIG. 14, an output file "XD+unique ID1", an output file "XD+unique ID2", an output file "XD+unique ID3", and so forth are output, and an input file "YD" is read. There is one input file for N output files (N being a natural number). For example, one file is generated and output for each record, and a plurality of records are collected in one file and are read. In the file name of an output file, for example, a slip ID is utilized as a unique ID. Hereinafter, the predecessor-successor relationship illustrated in FIG. 14 is referred to as a predecessor-successor relationship D.

Figure 15:
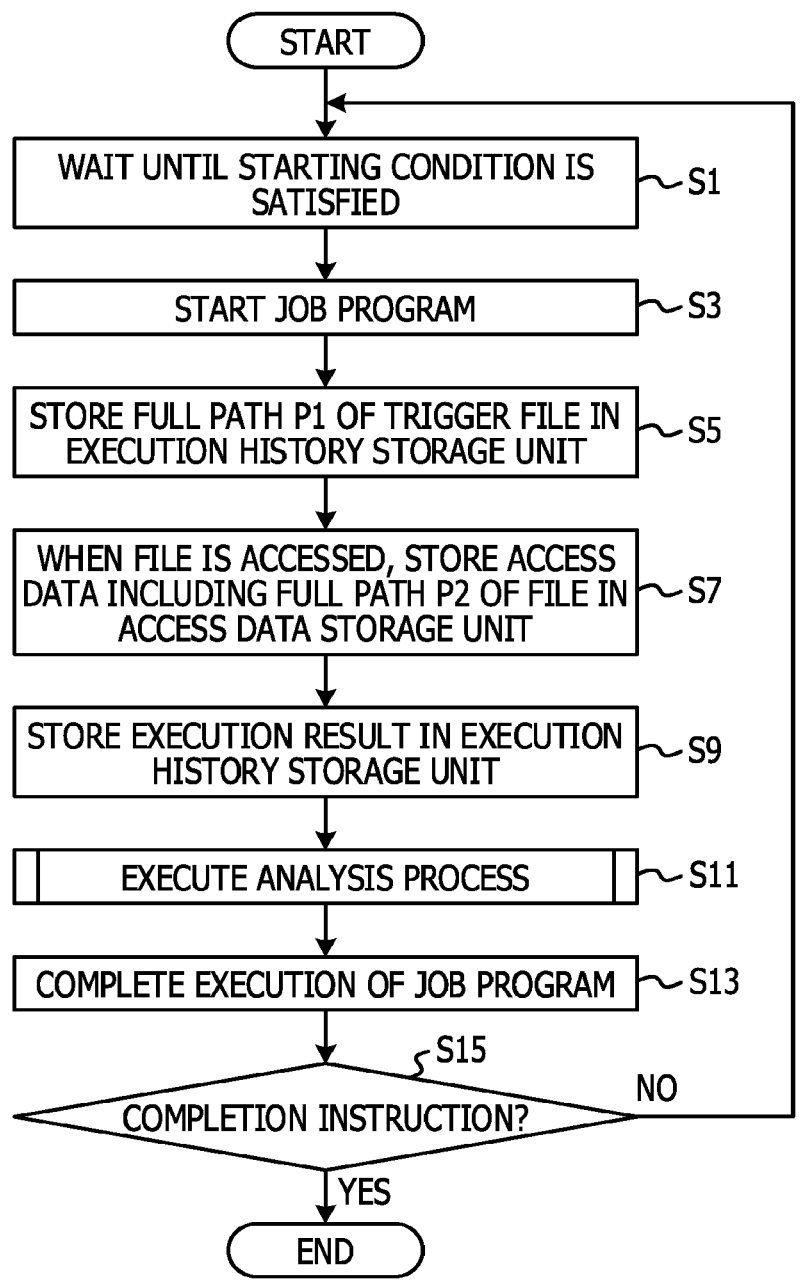
FIG. 15 illustrates a main processing flow.

Next, with reference to FIG. 15 to FIG. 19, processes executed by the server 1 will be described. The job management unit 101 of the server 1 waits until any starting condition registered in the job definition storage unit 104 is satisfied (FIG. 15: step S1).

If the starting condition is satisfied, the job management unit 101 starts a job program 107 to be started (step S3). In step S3, it is assumed that a starting condition for "wait for file" is satisfied (here, a trigger file is caused to be stored in the file storage unit 106). Then, a job corresponding to the trigger file is identified from the job definition storage unit 104, and the job program 107 of the identified job is started.

The job management unit 101 stores a full path P1 of the trigger file stored in the file storage unit 106, in the execution history storage unit 103 (step S5).

It is assumed that the job program 107 started in step S3 initiates a job, and a file stored in the file storage unit 106 is accessed. When the file is accessed, the job management unit 101 stores access data including a full path P2 of the accessed file, in the access data storage unit 105 (step S7). The access data includes information representing the full path of a file accessed, a job name, an access type, and access permission to the file.

Upon obtaining an execution result of the job, the job management unit 101 stores an execution result of the job in the execution history storage unit 103 (step S9). The execution result of the job includes, for example, information representing the status of the job and a completion code.

The job management unit 101 calls the analysis unit 102. In response to this, the analysis unit 102 executes an analysis process (step S11). The analysis process will be described with reference to FIG. 16A to FIG. 19.

Figure 16A:
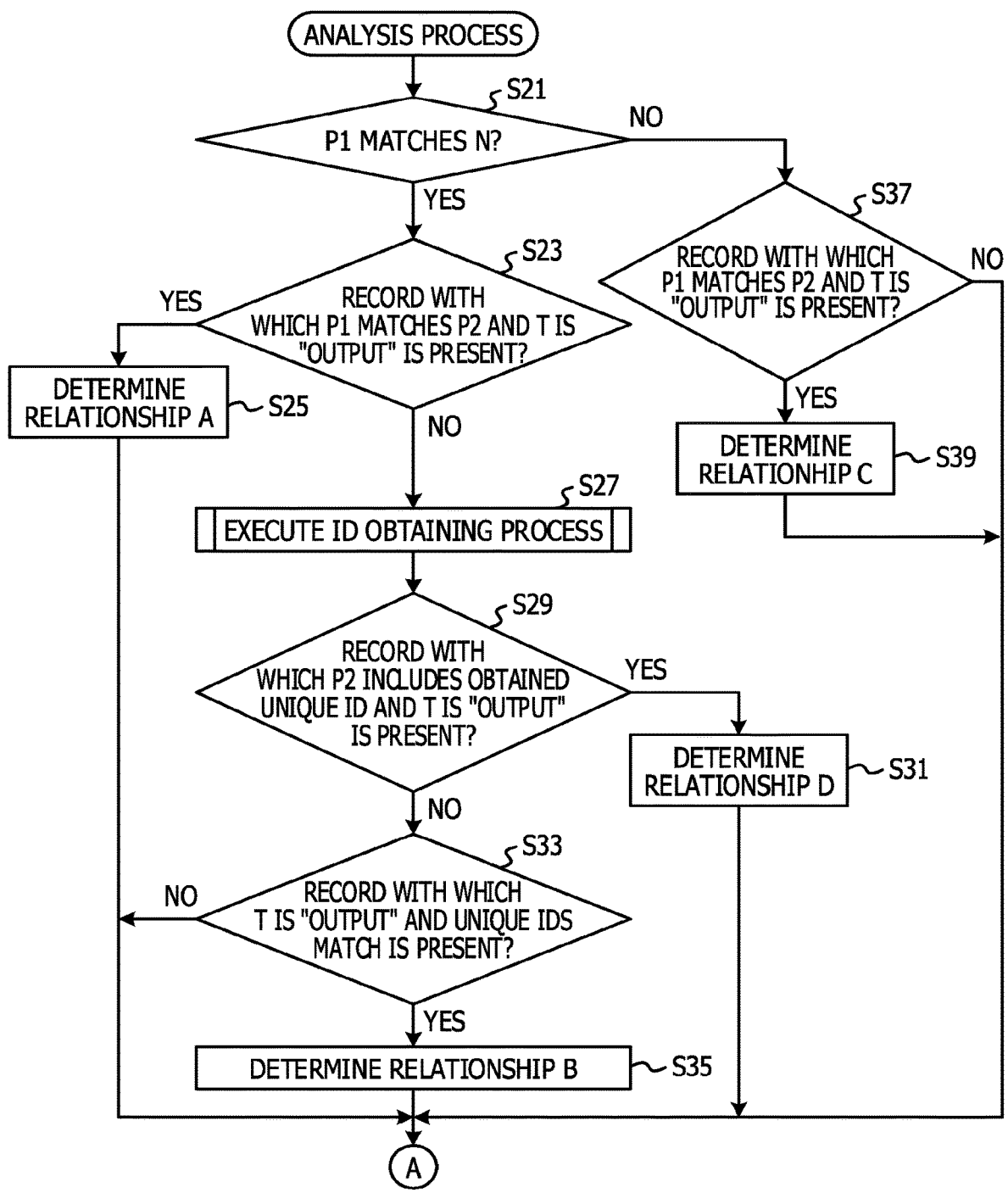
FIG. 16A illustrates a processing flow of an analysis process.

First, the analysis unit 102 determines whether or not the full path P1 of the trigger file, which is stored in the execution history storage unit 103, matches a file name N of the trigger file, which is stored in the job definition storage unit 104 (FIG. 16A: step S21).

If the full path P1 matches the file name N of the trigger file stored in the job definition storage unit 104 (step S21: Yes), the file name of the trigger file is fixed. Accordingly, the analysis unit 102 determines whether or not a record that satisfies a first condition that the full path P2 of the accessed file match the full path P1 of the trigger file and an access type T be "output" is present in the access data storage unit 105 (step S23).

Figure 16B:
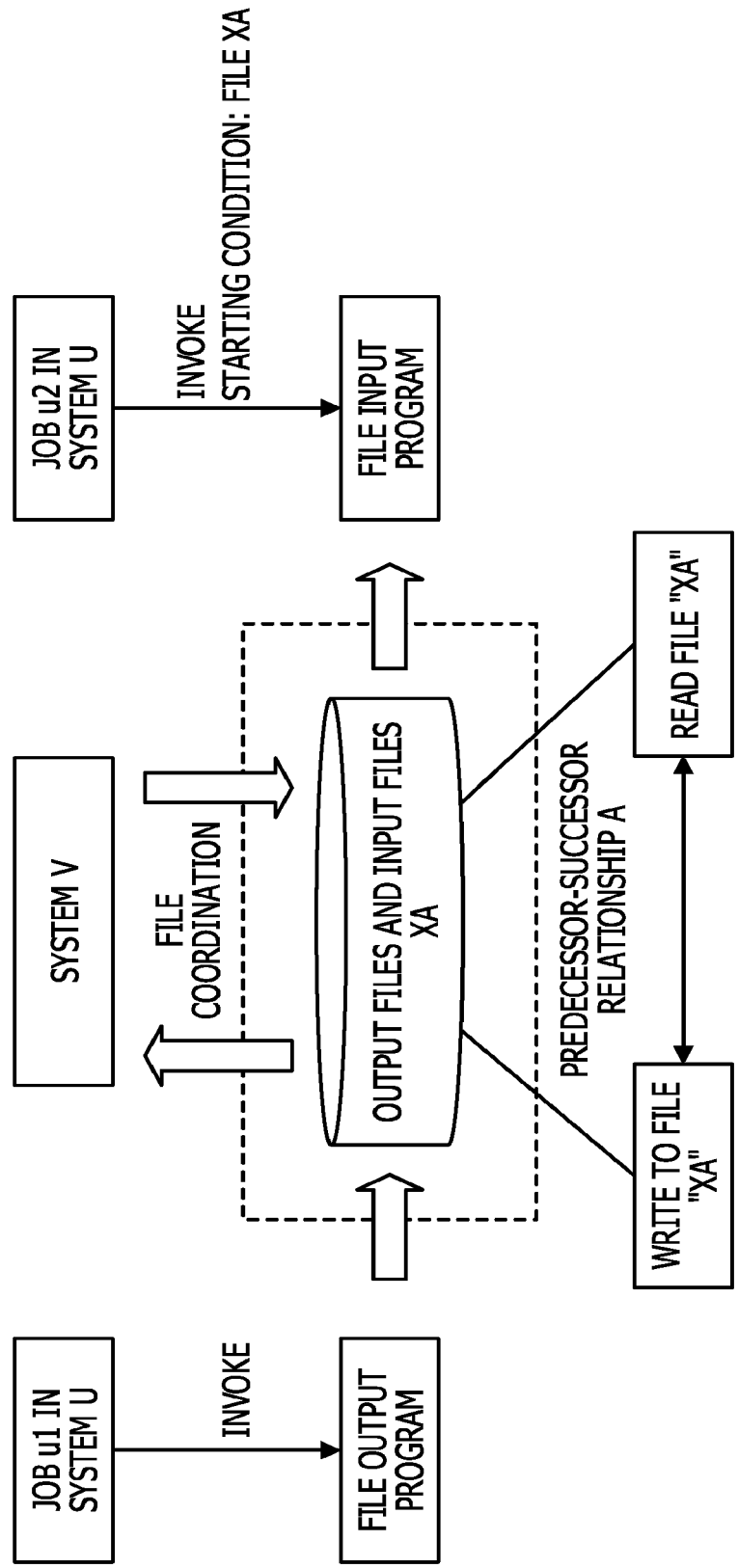

If a record that satisfies the first condition is present (step S23: Yes), the analysis unit 102 determines that the predecessor-successor relationship between the job of reading the input file (that is, the trigger file) and the job of performing writing to an output file is the predecessor-successor relationship A (step S25). In this way, the predecessor-successor relationship A is identified by comparison of the file name of a file to which writing is performed with the file name of a file from which reading is performed. This is schematically represented as illustrated in FIG. 16B.

The analysis unit 102 registers the job of accessing the file with the full path P2, as the predecessor job, in a field of the predecessor-successor relationship for the job of accessing the file with the full path P1 in the job definition storage unit 104. The process proceeds through a page connector A to step S41 in FIG. 19.

If no record that satisfies the first condition is present (step S23: No), the analysis unit 102 executes an ID obtaining process with the trigger file as a file being processed (step S27). The ID obtaining process will be described with reference to FIG. 17.

Figure 17:
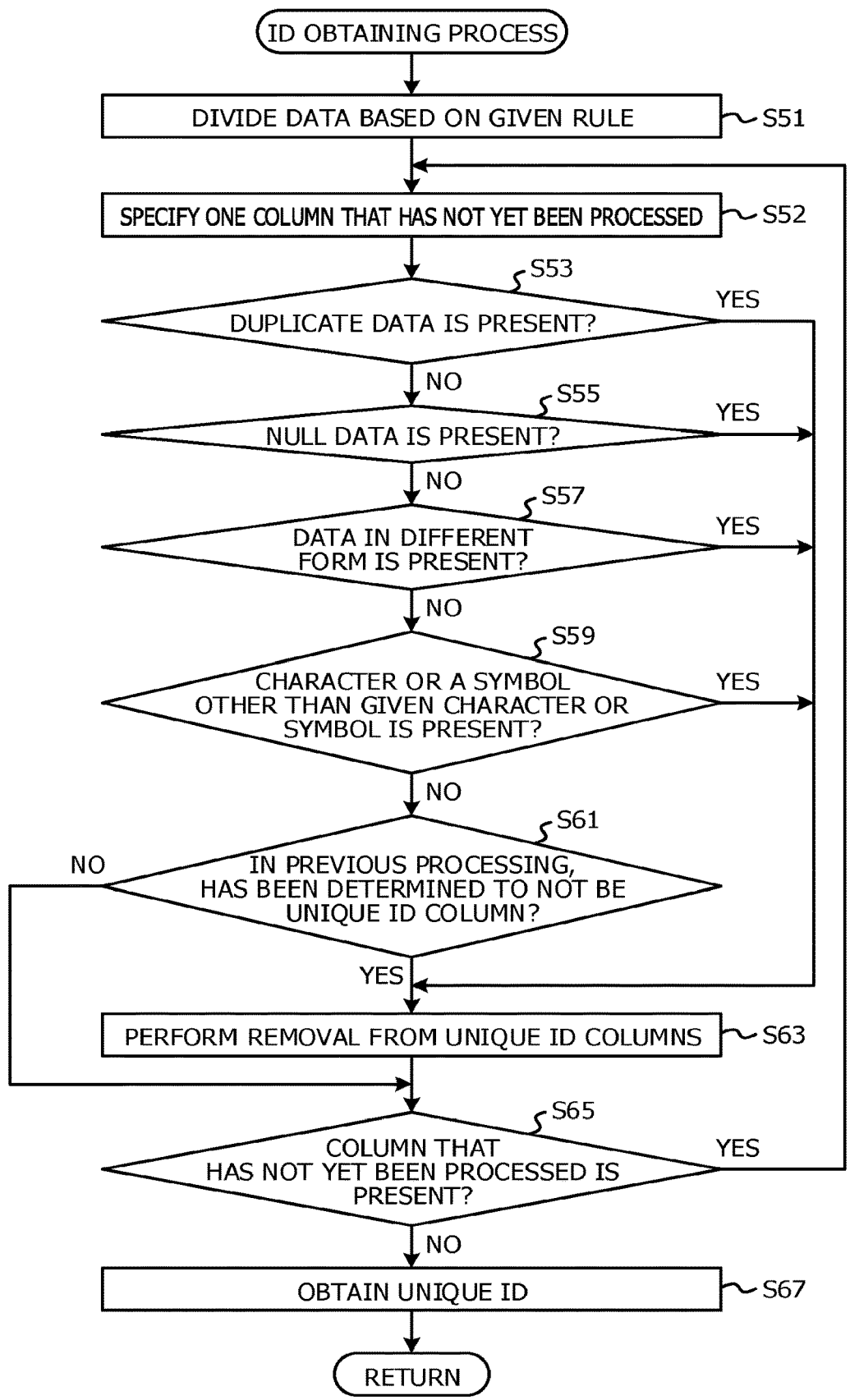
FIG. 17 illustrates a processing flow of an ID obtaining process.

First, the analysis unit 102 divides data in a file stored in the file storage unit 106 (here, the trigger file as a file being processed) based on a given rule (FIG. 17: step S51). The given rule is, for example, a rule that one row be one record and a comma or a tub be a pause. Here, the analysis unit 102 registers the column numbers for all the columns generated by division, as initial column numbers, in the unique ID column number field of the access data stored in step S7.

The analysis unit 102 specifies one column that has not yet been processed in the data after division (step S52).

The analysis unit 102 determines whether or not duplicate data is present in the specified column (step S53). Data in the file stored in the file storage unit 106 is assumed to be in a state, for example, as illustrated in FIG. 18. In this case, data "a01" is duplicated in the first column, and thus it is determined that the first column is not a unique ID column. If duplicate data is present in the specified column (step S53: Yes), the process proceeds to step S63.

If no duplicate data is present in the specified column (step S53: No), the analysis unit 102 determines whether or not null data is present in the specified column (step S55). Data in the file stored in the file storage unit 106 is assumed to be in a state, for example, as illustrated in FIG. 18. In this case, null data is present in the second column, and thus it is determined that the second column is not a unique ID column. If null data is present in the specified column (step S55: Yes), the process proceeds to step S63.

If no null data is present in the specified column (step S55: No), the analysis unit 102 determines whether or not data in a different form (for example, a different number of digits or a different hyphen position) is present in the specified column (step S57). Data in the file stored in the file storage unit 106 is assumed to be in a state, for example, as illustrated in FIG. 18. In this case, the third column contains data "c-04", and the form of this data differs from that of the other data, and thus the third column is determined to not be a unique ID column. If data in a different form is present in the specified column (step S57: Yes), the process proceeds to step S63.

If no data in a different form is present in the specified column (step S57: No), the analysis unit 102 determines whether or not a character or a symbol is present other than the given character or symbol in the identified column (step S59). The given character is, for example, an alphanumeric character, and the given symbol is, for example, a mathematical symbol. Data in the file stored in the file storage unit 106 is assumed to be in a state, for example, as illustrated in FIG. 18. In this case, data "a" is stored in the fourth column, and thus, if "a" is not a given character, the fourth column is determined to not be a unique ID column. If a character or a symbol other than the given character or symbol is present (step S59: Yes), the process proceeds to step S63.

If no character or symbol other than the given character or symbol is present in the specified column (step S59: No), the analysis unit 102 determines whether or not, in the processing performed up to the previous time, the specified column has been determined to not be a unique ID column (step S61). If the column number for the specified column is not registered in the unique ID column of a record for the file being processed, which is stored in the access data storage unit 105, it is determined, in step S61, that, in the processing performed up to the previous time, the specified column has been determined to not be a unique ID column. If, in the processing performed up to the previous time, the specified column has been determined to be a unique ID column (step S61: No), the process proceeds to step S65. Executing such processing removes information that is not suitable to be used as a unique ID.

If, in the processing performed up to the previous time, the specified column has been determined to not be a unique ID column (step S61: Yes), the analysis unit 102 removes the column number for the specified column from the unique ID column number field in the access data stored unit 105 (step S63).

The analysis unit 102 determines whether or not a column that has not yet been processed is present in data in the file being processed (step S65). If a column that has not yet been processed is present (step S65: Yes), the process returns to step S52 in order to perform processing for the next column. On the other hand, if no column that has not yet been processed is present (step S65: No), the analysis unit 102 obtains a unique ID from the file being processed (step S67). Note that in the case where a plurality of records are contained in the file being processed, a plurality of unique IDs are obtained. Then, the process returns to the calling process.

Returning now to the description of FIG. 16A, the analysis unit 102 determines whether or not a record that satisfies a second condition that the full path P2 of the accessed file include the unique ID obtained in step S27 and the access type T be "output" is present in the access data storage unit 105 (step S29). If, in step S27, a plurality of unique IDs are obtained, it is determined whether or not the full path P2 of the accessed file includes any of the plurality of unique IDs.

If a record that satisfies the second condition is present (step S29: Yes), the analysis unit 102 determines that the predecessor-successor relationship between the job of reading the input file (that is, the trigger file) and the job of performing writing to the output file is the predecessor-successor relationship D (step S31). In this way, the predecessor-successor relationship D is identified by comparison of the unique ID included in the output file name with the unique ID contained in the input file. This is schematically represented as illustrated in FIG. 16C.

The analysis unit 102 registers the job of accessing the file with the full path P2, as the predecessor job, in a field of the predecessor-successor relationship for the job of accessing the file with the full path P1 in the job definition storage unit 104. The process proceeds through the page connector A to step S41 in FIG. 19.

On the other hand, if no record that satisfies the second condition is present (step S29: No), the analysis unit 102 obtains a unique ID through the ID obtaining process performed for the file identified by the full path P2. The ID obtaining process is as described above. Note that, in the case where a plurality of records are contained in the file identified by the full path P2, a plurality of unique IDs are obtained. The analysis unit 102 then determines whether or not a record that satisfies a third condition that the access type T be "output" and the unique ID obtained from the file identified by the full path P2 match the unique ID obtained in step S27 is present in the access data storage unit 105 (step S33). In the case where a plurality of unique IDs are obtained from the file identified by the full path P2, it is determined whether or not any of the plurality of unique IDs matches any of the unique IDs obtained in step S27.

Figure 16D:
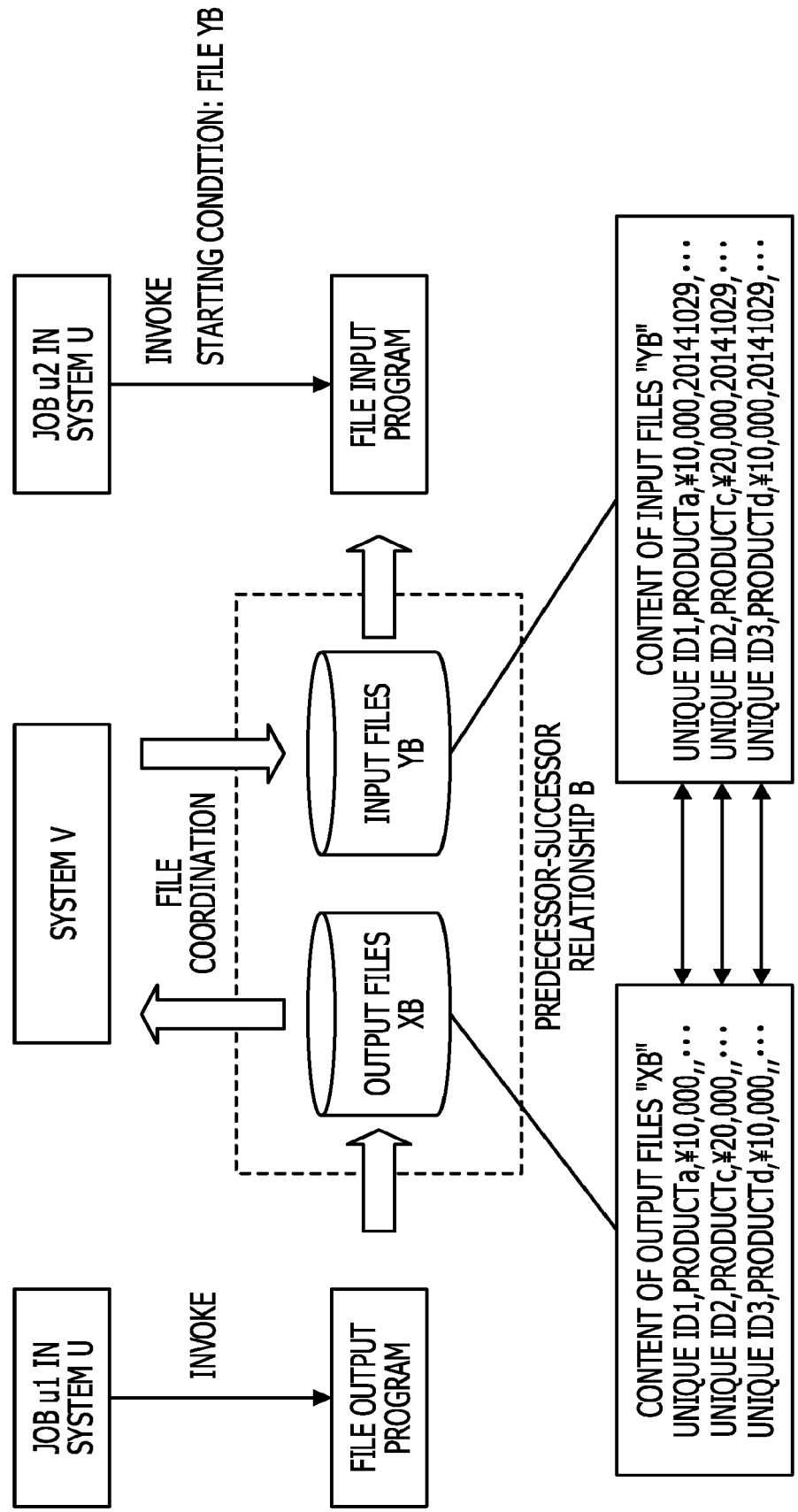

If no record that satisfies the third condition is present (step S33: No), the process proceeds through the page connector A to step S41 in FIG. 19. On the other hand, if a record that satisfies the third condition is present (step S33: Yes), the analysis unit 102 determines that the predecessor-successor relationship between the job of reading the input file (that is, the trigger file) and the job of performing writing to the output file is the predecessor-successor relationship B (step S35). In this way, the predecessor-successor relationship B is identified by comparison of the unique ID contained in the output file with the unique ID contained in the input file. This is schematically represented as illustrated in FIG. 16D.

The analysis unit 102 registers the job of accessing the file with the full path P2, as the predecessor job, in a field of the predecessor-successor relationship for the job of accessing the file with the full path P1 in the job definition storage unit 104. The process proceeds through the page connector A to step S41 in FIG. 19.

On the other hand, if the full path P1 of the trigger file does not match the file name N of the trigger file stored in the job definition storage unit 104 (step S21: No), the file name of the trigger file is not fixed. This has the meaning that part of the file name is variable (for example, a wild card portion). Accordingly, the analysis unit 102 determines whether or not a record that satisfies a fourth condition that the full path P2 of the accessed file contain the string of a mismatch part (for example, a wild card portion) in the full path P1 of the trigger file and the access type T be "output" is present in the access data storage unit 105 (step S37).

Figure 16E:
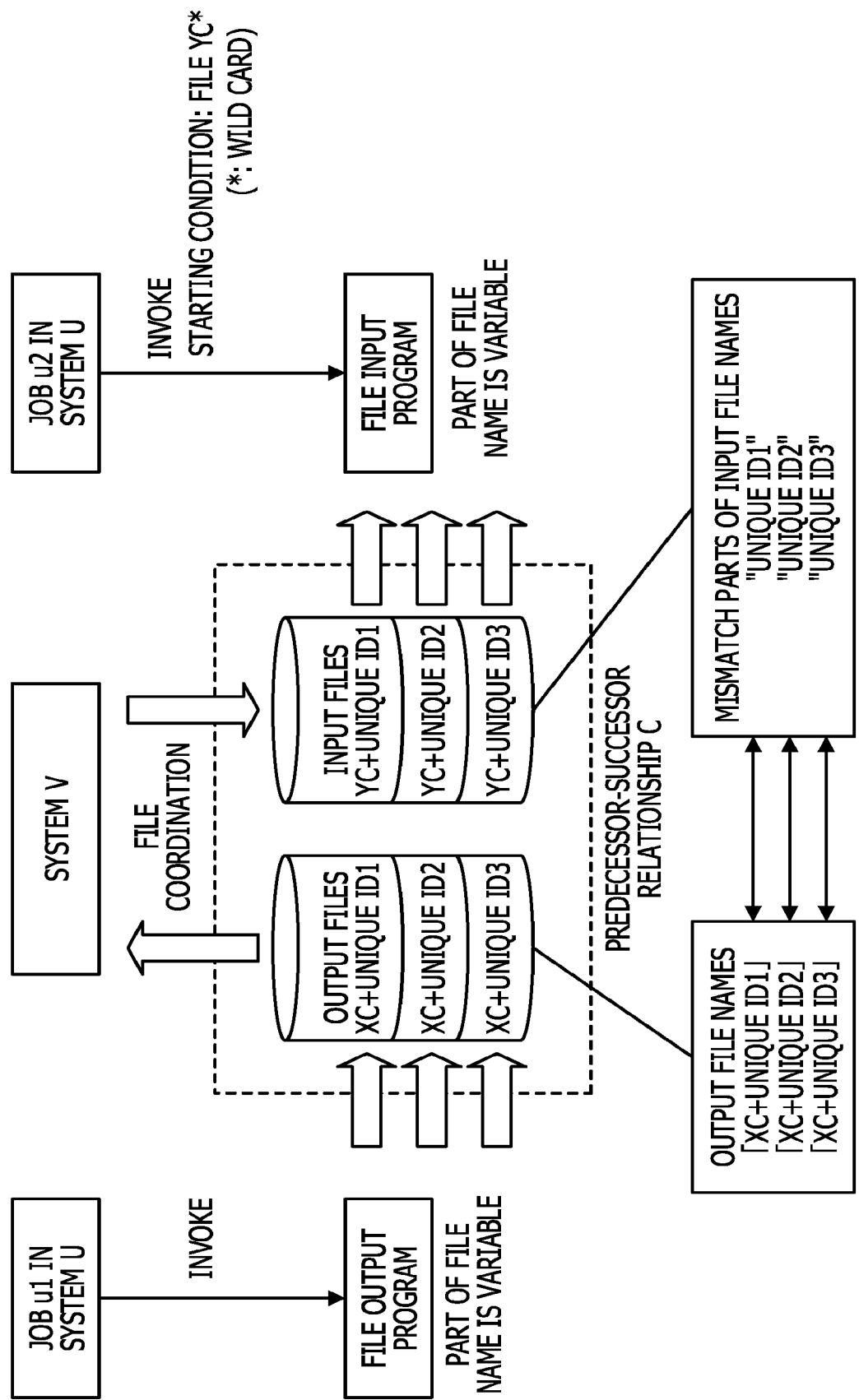

If no record that satisfies the fourth condition is present (step S37: No), the process proceeds through the page connector A to step S41 in FIG. 19. On the other hand, if a record that satisfies the fourth condition is present (step S37: Yes), the analysis unit 102 determines that the predecessor-successor relationship between the job of reading the input file (that is, the trigger file) and the job of performing writing to the output file is the predecessor-successor relationship C (step S39). In this way, the predecessor-successor relationship C is identified by comparison of the unique ID included in the output file name with the mismatch part included in the input file name. This is schematically represented as illustrated in FIG. 16E.

The analysis unit 102 registers the job of accessing the file with the full path P2, as the predecessor job, in a field of the predecessor-successor relationship for the job of accessing the file with the full path P1 in the job definition storage unit 104. The process proceeds through the page connector A to step S41 in FIG. 19.

Figure 19:
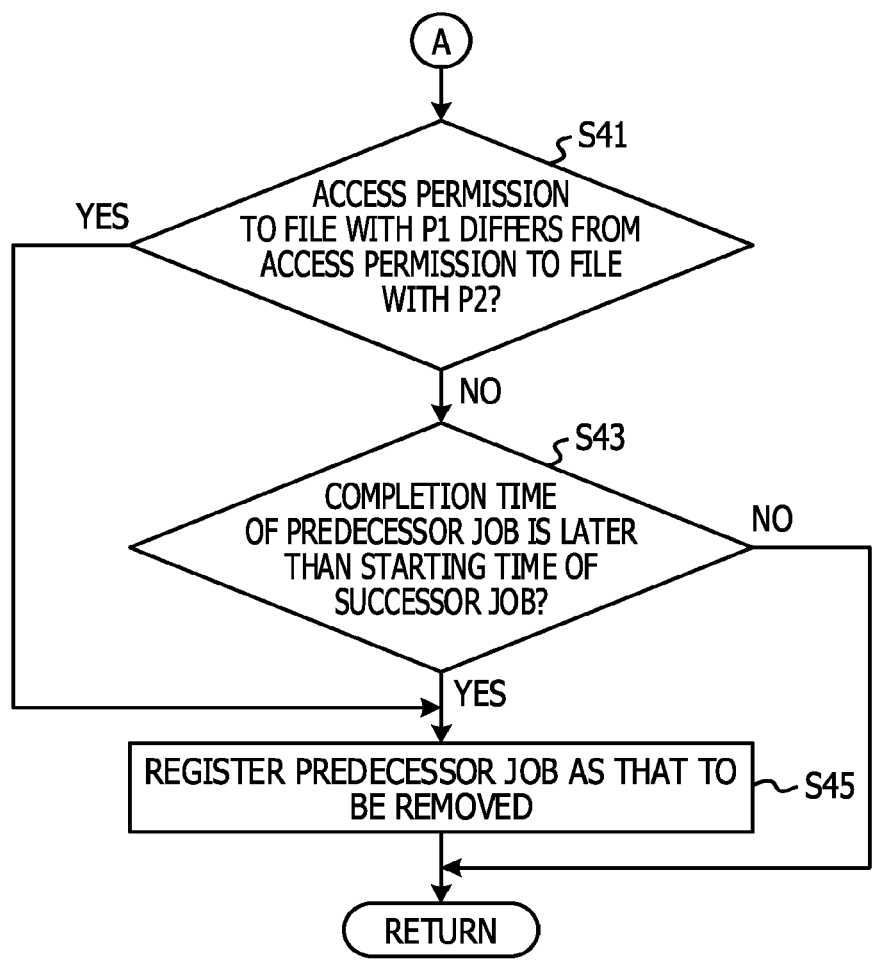
FIG. 19 illustrates a processing flow of the analysis process.

Turning now to the description of FIG. 19, the analysis unit 102 determines whether or not information indicating access permission to the file with the full path P1 differs from information indicating access permission to the file with the full path P2 (step S41). The files between which information indicating access permission is compared in step S41 are files processed by jobs that are, in the above process, determined to have the predecessor-successor relationship D, B, or C. If the information indicating access permission to the file with the full path P1 differs from the information indicating access permission to the file with the full path P2 (step S41: Yes), the process proceeds to step S45. This is because, for example, files handled by the production management department are typically subjected to access control in which, for example, the file is not able to be referred to from batch operations in the labor department.

On the other hand, if the information indicating access permission to the file with the full path P1 and the information indicating access permission to the file with the full path P2 are the same (step S41: No), the analysis unit 102 determines, for the predecessor job and a successor job that are determined in the above process to have a predecessor-successor relationship, whether or not the completion time of the predecessor job is later than the starting time of the successor job (step S43). Note that the predecessor job is a job of accessing the file with the full path P2, and the successor job is a job of accessing the file with the full path P1. The completion time and the starting time are identified from the execution history storage unit 103.

If the completion time of the predecessor job is not later than the starting time of the successor job (step S43: No), the process returns to the calling process. On the other hand, the completion time of the predecessor job is later than the starting time of the successor job (step S43: Yes), the analysis unit 102 registers the job of accessing the file with the full path P2, as a predecessor job to be removed, in a field of the predecessor-successor relationship for the successor job in the job definition storage unit 104 (step S45). In addition, when the job registered as a predecessor job to be removed has been registered as the predecessor job, the analysis unit 102 deletes the registration. Then, the process returns to the calling process.

When a file that is read by a certain job is derived from a file to which writing is performed by another job, there is a possibility that the former job is the predecessor job and the latter job is the successor job. Therefore, executing a process as described above appropriately identifies the predecessor job and the successor job.

Returning now to the description of FIG. 15, the job management unit 101 completes execution of the job program 107 started in step S3 (step S13).

The job management unit 101 determines whether or not a completion instruction is received from the client terminal 3 (step S15). If the completion instruction is not received (step S15: No), the process returns to step S1. On the other hand, if the completion instruction is received (step S15: Yes), the process is completed. Then, the client terminal 3 receives data representing the predecessor-successor relationship registered in the job definition storage unit 104 from the server 1 and outputs the data to a display device or the like to cause the administrator to confirm the predecessor-successor relationship.

Executing a process as described above makes it possible for the administrator who has confirmed the data representing the predecessor-successor relationship registered in the job definition storage unit 104 to keep track of the predecessor-successor relationship of a plurality of jobs that cooperate. This allows the administrator to take measures so as to obtain a more appropriate state of operations of the server 1. For example, a change is made to two jobs that cooperate through using files so that the two jobs cooperate not through using files but through writing to a storage device, which may reduce the time taken until the processing is finally completed.

Next, with reference to FIGS. 20, 22, and 23, additional description will be given of a process of modifying a predecessor-successor relationship after that relationship is once determined.

For example, as depicted in FIG. 20, it is assumed that data indicating the presence of the predecessor-successor relationship between a job "out99" and a job "in3" is registered in the job definition storage unit 104 by mistake. It is assumed that, at the point of registration, as depicted in FIG. 21, data indicating that the completion time of the job "out99" is earlier than the starting time of the job "in3" is registered in the execution history storage unit 103.

Then, as depicted in records "5" and "6" in FIG. 22, it is assumed that data indicating that the completion time of the job "out99" is later than the starting time of the job "in3" is newly registered in the execution history storage unit 103. In such a case, as depicted in FIG. 23, data indicating that the job "out99" is incapable of being the predecessor job to the job "in3" is registered in the job definition storage unit 104.

In this way, according to the present embodiment, the predecessor-successor relationship may be repeatedly verified, and thus the predecessor-successor relationship that is more likely to be certain may be derived.

Although one embodiment of the present disclosure has been described above, the present disclosure is not limited to this embodiment. For example, the functional block configuration of the server 1 described above does not have to match the actual program module configuration.

The predecessor-successor relationship between jobs may be comprehensively determined by combining a result of the above processes with a result of a process using another well-known technique.

The configurations of the tables described above are exemplary, and the tables do not have to have configurations as described above. Furthermore, in the processing flow, the order in which processing is performed may be rearranged if the processing result is not changed. Furthermore, the processes may be executed concurrently.

Figure 24:
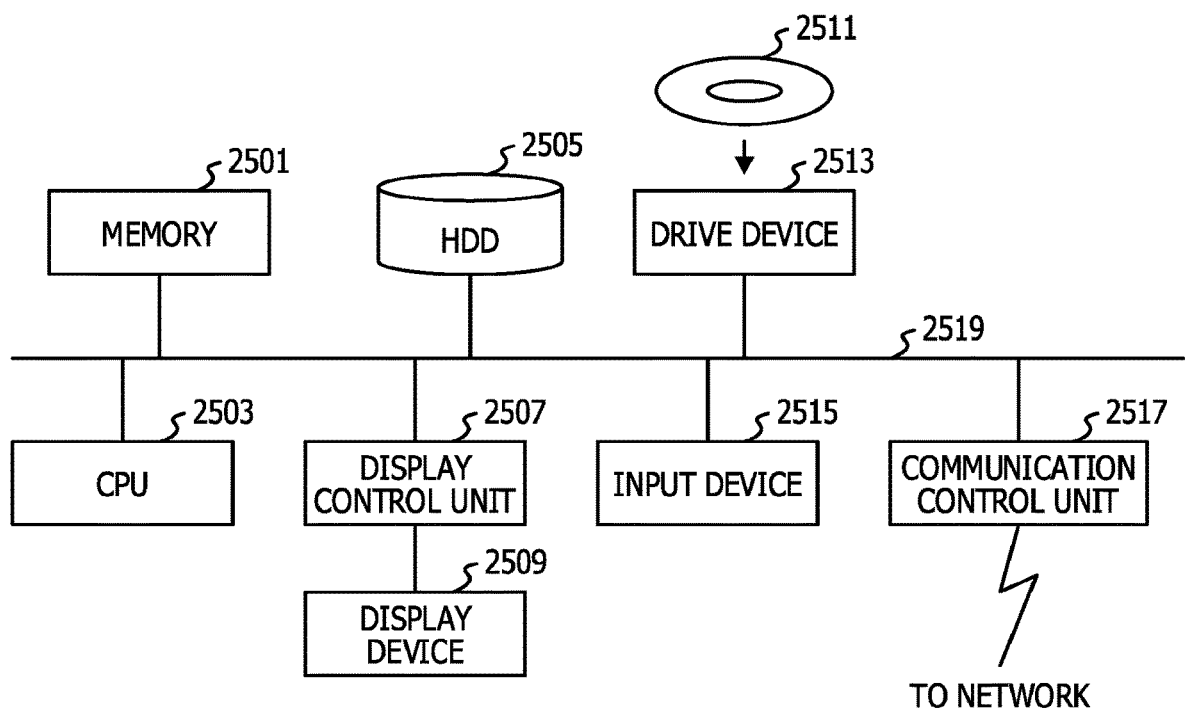
FIG. 24 is a functional block diagram of a computer.

Note that the server 1 described above is a computer, in which, as illustrated in FIG. 24, a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 for coupling to a network are coupled by a bus 2519. An operating system (OS) and application programs for performing the processes in the present embodiment are stored in the HDD 2505 and, when being executed by the CPU 2503, are read from the HDD 2505 to the memory 2501. The CPU 2503 controls the display control unit 2507, the communication control unit 2517, and the drive device 2513 in accordance with the processing details of the application programs so as to cause them to perform predetermined operations. Data being processed is mainly stored in the memory 2501 but may be stored in the HDD 2505. In the embodiment of the present disclosure, application programs for performing the processing described above are stored and distributed in a computer-readable removable disk 2511 and are installed from the drive device 2513 into the HDD 2505. In some cases, the application programs pass through a network such as the Internet and the communication control unit 2517 and are installed in the HDD 2505. Such a computer device, in which hardware such as the CPU 2503 and the memory 2501 and programs such as the OS and the application programs organically cooperate, implements various functions as described above.

The embodiment of the present disclosure described above is summarized as described below.

A management support method according to the present embodiment includes processing of (A) based on a file name or file content of a first file to which writing is performed by a first job and a file name or file content of a second file from which reading is performed by a second job, determining whether or not the second file is derived from the first file, and (B) if it is determined that the second file is derived from the first file, creating information representing that the first job is a job preceding the second job.

In such a way, the predecessor-successor relationship of a plurality of jobs that cooperate through using files is tracked.

Additionally, the management support method may further include processing of (C) determining whether or not a time at which the first job is completed is prior to a time at which the second job is started. In the processing of creating information, (b1) if it is determined that the second file is derived from the first file and the time at which the first job is completed is prior to the time at which the second job is started, information representing that the first job is a job preceding the second job may be created. In this way, it is more reliably achieved that the first job is a job preceding the second job.

Additionally, the management support method may further include processing of (D) determining whether or not first permission information on permission to access the first file matches second permission information to access the second file. In the processing of creating information, (b2) if it is determined that the second file is derived from the first file and the first permission information matches the second permission information, information representing the first job precedes the second job may be created. If the second file is derived from the first file, the second permission information matches the first permission information. Therefore, such a way as mentioned above inhibits an incorrect result from being derived.

Additionally, in the processing of determining whether or not the second file is derived from the first file, (a1) it may be determined whether or not the file name of the first file matches the file name of the second file. When, even if the first file and the second file differ in file content, their file names match, there is a possibility that the second file is derived from the first file. Therefore, in such a way as mentioned above, it is appropriately determined whether or not the second file is derived from the first file.

Additionally, in the processing of determining whether or not the second file is derived from the first file, (a2) it may be determined whether or not part of the file name of the first file matches part of the file name of the second file. When, for example, variable portions (such as portions each including information on the date) in the file names are the same, there is a possibility that the second file is derived from the first file. Therefore, in such a way as mentioned above, it is appropriately determined whether or not the second file is derived from the first file.

Additionally, in the processing of determining whether or not the second file is derived from the first file, (a3) it may be determined that the file name of the first file includes any of one or a plurality of identifiers for identifying one or a plurality of records included in the second file. When the first file and the second file are related to the same identifier (such as a slip ID), there is a possibility that the second file is derived from the first file. Therefore, in such a way as mentioned above, it is appropriately determined whether or not the second file is derived from the first file.

Additionally, in the processing of determining whether or not the second file is derived from the first file, (a4) it may be determined whether or not one or a plurality of identifiers for identifying one or a plurality of records contained in the first file match one or a plurality of identifiers for identifying one or a plurality of records contained in the second file. When the first file and the second file are related to the same identifier (such as a slip ID), there is a possibility that the second file is derived from the first file. Therefore, in such a way as mentioned above, it is appropriately determined whether or not the second file is derived from the first file.

Note that a program for causing a computer to execute the processing according to the above method may be created, and that program is stored in, for example, a computer-readable storage medium, such as a flexible disk, a compact disk read-only memory (CD-ROM), a magneto-optical disk, a semiconductor memory, or a hard disk, or a storage device. Note that intermediate processing results are temporarily retained in a storage device such as main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer implemented method for cooperation among a predecessor job, executing an input trigger file, and a successor job executing an output access file, through a predecessor-successor relationship, the method performing following steps:
    waiting, by a processor of a server, for the access file until satisfying a starting condition when the trigger file is stored in a storage device of the server;
    starting, by the processor, a job program when the starting condition is satisfied;
    storing, by the processor, a full path of the trigger file in an execution history of the storage device;
    storing, by the processor, access data including another full path of the access file in the storage device together with an access type and an access permission for the access file;
    obtaining, by the processor, an execution result and a completion code to store the execution result in the execution history of the storage device;
    determining, by the processor, the predecessor-successor relationship of the predecessor job reading the inputted trigger file and the successor job writing the output access file, based on a matching of the full path of the trigger file with the other full path of the access file when the access type is absent;
    dividing, by the processor, data in the trigger file based on a rule that registers column numbers for all columns generated by the division, as initial column numbers corresponding to unique identifiers of a unique identifier column number field of the stored access data;
    identifying, by the processor, a character or symbol in a column that has not yet been processed after the data division;
    determining, by the processor, that duplicate data and null data of the unique identifiers are not present in the identified column;
    determining, by the processor, that different data, comprising a different number of digits or a different hyphen position of the unique identifiers, is not present in the identified column;
    determining, by the processor, that any other character or symbol is not present in the identified column;
    removing, by the processor, a column number of the identified column from the unique identifier column number field;
    determining, by the processor, that there is no other column that has yet to be processed;
    obtaining, by the processor, one of the unique identifiers from the trigger file being processed;
    repeatedly verifying, by the processor, the predecessor-successor relationship based on whether the other full path of the access file includes the one unique identifier;
    determining, by the processor, based on the predecessor-successor relationship, that the access permission to the trigger file with the full path does not differ from the access permission to the access file with the other full path;
    determining, by the processor, that completion time of the predecessor job accessing the access file with the other full path is later than starting time of the successor job with the full path; and
    changing, by the processor, the predecessor-successor relationship in the cooperation among the predecessor and successor jobs to reduce execution time of the job program through the writing of the output access file to the storage device by deleting a registration of the predecessor job accessing the access file with the other full path in the predecessor-successor relationship, in order to complete the execution of the job program.

2. The method according to claim 1, further comprising:
    determining, by the processor, whether the access file is derived from the trigger file.

3. The method according to claim 2, wherein the determining whether the access file is derived from the trigger file includes determining whether a file name of the trigger file matches a file name of the access file.

4. The method according to claim 2, wherein the determining whether the access file is derived from the trigger file includes determining whether part of a file name of the trigger file matches part of a file name of the access file.

5. The method according to claim 2, wherein the determining whether the access file is derived from the trigger file includes determining whether a file name of the trigger file includes any of one or more identifiers for identifying one or more records included in the access file.

6. The method according to claim 2, wherein the determining whether the access file is derived from the trigger file includes determining whether one or more identifiers for identifying one or more records included in the trigger file match one or more identifiers for identifying one or more records included in the access file.

7. A system for cooperation among a predecessor job, executing an input trigger file, and a successor job executing an output access file, through a predecessor-successor relationship, the system comprising:
    a processor of a server configured to:
        wait for the access file until satisfying a starting condition when the trigger file is stored in a storage device of the server;
        start, a job program when the starting condition is satisfied;
        store a full path of the trigger file in an execution history of the storage device;
        store access data including another full path of the access file in the storage device together with an access type and an access permission for the access file;

obtain an execution result and a completion code to store the execution result in the execution history of the storage device;

determine the predecessor-successor relationship of the predecessor job reading the inputted trigger file and the successor job writing the output access file, based on a matching of the full path of the trigger file with the other full path of the access file when the access type is absent;

divide data in the trigger file based on a rule that registers column numbers for all columns generated by the division, as initial column numbers corresponding to unique identifiers of a unique identifier column number field of the stored access data;

identify a character or symbol in a column that has not yet been processed after the data division;

determine that duplicate data and null data of the unique identifiers are not present in the identified column;

determine that different data, comprising a different number of digits or a different hyphen position of the unique identifiers, is not present in the identified column;

determine that any other character or symbol is not present in the identified column;

remove a column number of the identified column from the unique identifier column number field;

determine that there is no other column that has yet to be processed;

obtain one of the unique identifiers from the trigger file being processed;

repeatedly verify the predecessor-successor relationship based on whether the other full path of the access file includes the one unique identifier;

determine, based on the predecessor-successor relationship, that the access permission to the trigger file with the full path does not differ from the access permission to the access file with the other full path;

determine that completion time of the predecessor job accessing the access file with the other full path is later than starting time of the successor job with the full path; and change the predecessor-successor relationship in the cooperation among the predecessor and successor jobs to reduce execution time of the job program through the writing of the output access file to the storage device by deleting a registration of the predecessor job accessing the access file with the other full path in the predecessor-successor relationship, in order to complete the execution of the job program.

8. The system according to claim 7, wherein the processor is further configured to determine whether the access file is derived from the trigger file.

9. The system according to claim 8, wherein the processor determines whether the access file is derived from the trigger file by determining whether a file name of the trigger file matches a file name of the access file.

10. The system according to claim 8, wherein the processor determines whether the access file is derived from the trigger file by determining whether part of a file name of the trigger file matches part of a file name of the access file.

11. The system according to claim 8, wherein the processor determines whether the access file is derived from the trigger file by determining whether a file name of the trigger file includes any of one or more identifiers for identifying one or more records included in the access file.

12. The system according to claim 8, wherein the processor determines whether the access file is derived from the trigger file by determining whether one or more identifiers for identifying one or more records included in the trigger file match one or more identifiers for identifying one or more records included in the access file.

13. A non-transitory storage medium storing a program for cooperation among a predecessor job, executing an input trigger file, and a successor job executing an output access file, through a predecessor-successor relationship, the stored program executed by a processor of a server to perform a process of:

waiting for the access file until satisfying a starting condition when the trigger file is stored in a storage device of the server;

starting a job program when the starting condition is satisfied;

storing a full path of the trigger file in an execution history of the storage device;

storing access data including another full path of the access file in the storage device together with an access type and an access permission for the access file;

obtaining an execution result and a completion code to store the execution result in the execution history of the storage device;

determining the predecessor-successor relationship of the predecessor job reading the inputted trigger file and the successor job writing the output access file, based on a matching of the full path of the trigger file with the other full path of the access file when the access type is absent;

dividing data in the trigger file based on a rule that registers column numbers for all columns generated by the division, as initial column numbers corresponding to unique identifiers of a unique identifier column number field of the stored access data;

identifying a character or symbol in a column that has not yet been processed after the data division;

determining that duplicate data and null data of the unique identifiers are not present in the identified column;

determining that different data, comprising a different number of digits or a different hyphen position of the unique identifiers, is not present in the identified column;

determining that any other character or symbol is not present in the identified column;

removing a column number of the identified column from the unique identifier column number field;

determining that there is no other column that has yet to be processed;

obtaining one of the unique identifiers from the trigger file being processed;

repeatedly verifying the predecessor-successor relationship based on whether the other full path of the access file includes the one unique identifier;

determining, based on the predecessor-successor relationship, that the access permission to the trigger file with the full path does not differ from the access permission to the access file with the other full path;

determining that completion time of the predecessor job accessing the access file with the other full path is later than starting time of the successor job with the full path; and changing, the predecessor-successor relationship in the cooperation among the predecessor and successor jobs to reduce execution time of the job program through the writing of the output access file to the storage device by deleting a registration of the predecessor job accessing the access file with the other full path in the predecessor-successor relationship, in order to complete the execution of the job program.

14. The non-transitory storage medium according to claim 13, wherein the process performed by the processor further includes determining whether the access file is derived from the trigger file.

15. The non-transitory storage medium according to claim 14, wherein the determining whether the access file is derived from the trigger file includes determining whether a file name of the trigger file matches a file name of the access file.

16. The non-transitory storage medium according to claim 14, wherein the determining whether the access file is derived from the trigger file includes determining whether part of a file name of the trigger file matches part of a file name of the access file.

17. The non-transitory storage medium according to claim 14, wherein the determining whether the access file is derived from the trigger file includes determining whether a file name of the trigger file includes any of one or more identifiers for identifying one or more records included in the access file.

18. The non-transitory storage medium according to claim 14, wherein the determining whether the access file is derived from the trigger file includes determining whether one or more identifiers for identifying one or more records included in the trigger file match one or more identifiers for identifying one or more records included in the access file.

* * * * *